(12) United States Patent
Doumani et al.

(10) Patent No.: US 10,981,239 B2
(45) Date of Patent: Apr. 20, 2021

(54) CUTTING DEVICE

(71) Applicant: Nanjing Chervon Industry Co., Ltd., Nanjing (CN)

(72) Inventors: Robert Doumani, Nanjing (CN); Junyong Yang, Nanjing (CN); Wenyang Liu, Nanjing (CN); Shisheng Wang, Nanjing (CN); Mingzhou Chen, Nanjing (CN); Eric Edward Blankinship, Nanjing (CN); Hong Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/839,879

(22) Filed: Apr. 3, 2020

(65) Prior Publication Data
US 2020/0316699 A1 Oct. 8, 2020

(30) Foreign Application Priority Data

Apr. 4, 2019 (CN) .......................... 201910269562.9
Jun. 28, 2019 (CN) .......................... 201910570698.3

(51) Int. Cl.
*B23D 57/02* (2006.01)
*B27B 17/08* (2006.01)

(52) U.S. Cl.
CPC .......... *B23D 57/023* (2013.01); *B27B 17/086* (2013.01)

(58) Field of Classification Search
CPC ... B27B 17/086; B27B 17/0083; B27B 17/12; B23D 57/023; B23D 59/006; B27G 19/003
See application file for complete search history.

(56) References Cited

U.S. PATENT DOCUMENTS

| | | | | |
|---|---|---|---|---|
| 4,290,202 A | * | 9/1981 | Nadenoff | B27G 19/003 30/382 |
| 4,393,589 A | * | 7/1983 | Barkhult | B27B 17/00 30/381 |
| 4,841,641 A | * | 6/1989 | Laidlaw | B27B 17/0008 30/382 |
| 4,893,407 A | * | 1/1990 | Lane | B27B 17/08 30/123.4 |
| 4,991,297 A | * | 2/1991 | Cain | B27G 19/003 30/382 |

(Continued)

*Primary Examiner* — Sean M Michalski
(74) *Attorney, Agent, or Firm* — Greenberg Traurig, LLP

(57) ABSTRACT

A cutting device includes a housing formed with a handle portion and an accommodation portion, a cutting portion connected to the housing and at least partially disposed in the accommodation portion, a motor disposed in the accommodation portion and extending in a first linear direction, and a bottom plate extending in a plane of the bottom plate and formed with an opening through which at least part of the cutting portion passes. The cutting device further includes a worm gear and worm structure disposed in the accommodation portion. The cutting portion includes a chain and a guide plate connected to the housing and used for supporting the chain. The motor includes an output shaft, the cutting portion is connected to a driving shaft, the output shaft transmits power to the driving shaft through a worm gear and a worm, and the driving shaft is capable of driving the chain.

20 Claims, 37 Drawing Sheets

(56) References Cited

U.S. PATENT DOCUMENTS

| | | | | |
|---|---|---|---|---|
| 5,077,896 | A | * | 1/1992 | Rivera ............... B23D 57/0076 30/122 |
| 5,236,314 | A | * | 8/1993 | Nagashima ............ F16N 13/02 184/33 |
| 7,055,250 | B2 | * | 6/2006 | Allemann ............ B23D 57/023 30/374 |
| 2010/0257743 | A1 | * | 10/2010 | George ................ B27B 17/083 30/383 |
| 2011/0203122 | A1 | * | 8/2011 | Holcomb ............... B27B 17/14 30/382 |
| 2011/0308096 | A1 | * | 12/2011 | Yu .......................... B27B 17/14 30/386 |
| 2012/0188089 | A1 | * | 7/2012 | Thomsen ............... F16P 3/144 340/686.3 |
| 2014/0053418 | A1 | * | 2/2014 | Fuchs ................. B23D 57/023 30/376 |
| 2014/0053682 | A1 | * | 2/2014 | Bendien ............. B27G 19/003 74/612 |
| 2015/0273722 | A1 | * | 10/2015 | Madson ................. B27B 17/02 30/373 |
| 2017/0203463 | A1 | * | 7/2017 | Towner ................... B27B 17/12 |
| 2017/0291237 | A1 | * | 10/2017 | Engelfried .......... B23D 59/006 |

* cited by examiner

CUTTING DEVICE

RELATED APPLICATION INFORMATION

This application claims the benefit under 35 U.S.C. § 119(a) of Chinese Patent Application No. CN 201910269562.9, filed on Apr. 4, 2019, and Chinese Patent Application No. CN 201910570698.3, filed on Jun. 28, 2019, which applications are incorporated herein by reference in their entirety.

TECHNICAL FIELD

The present invention relates to a cutting device.

BACKGROUND

As a combination of a larger cutting depth of a chain saw and a powerful power of an electric circular saw with a high precision, a cutting device finally has the characteristics of the large cutting depth and the better cutting precision. However, the cutting device also has some disadvantages while combining the two electric power tools. The disadvantages include the large volume, difficult operation by a user, insufficient lubrication of the chain during the lubrication process and other conditions, so that the cutting device has many problems in actual use. How to reduce the overall size of the cutting device and improve the user experience of the cutting device is a technical problem to be urgently solved by the person skilled in the art.

SUMMARY

In one aspect of the disclosure, a cutting device includes: a housing formed with a handle portion and an accommodation portion; a cutting portion connected to the housing and at least partially disposed in the accommodation portion; a motor disposed in the accommodation portion and extending in a first linear direction; and a bottom plate extending in a plane of the bottom plate and formed with an opening through which at least part of the cutting portion passes. The cutting device further includes a worm gear and worm structure, and the worm gear and worm structure are disposed in the accommodation portion. The cutting portion includes: a chain; and a guide plate connected to the housing and used for supporting the chain. The motor includes an output shaft, the cutting portion is connected to a driving shaft, the output shaft transmits power to the driving shaft through a worm gear and a worm structure, and the driving shaft is capable of driving the chain.

In a further aspect, the output shaft extends in the first linear direction, and the driving shaft extends in a second linear direction which is perpendicular to or intersects the first linear direction.

In a further aspect, the worm is disposed on the output shaft, the worm gear is disposed on the driving shaft, and the worm gear is kept in mesh with the worm.

In a further aspect, the cutting device further includes a fan connected to the output shaft and a flow guide member disposed between the fan and the worm, and the flow guide member is capable of guiding at least part of the heat dissipation air to the worm gear and the worm.

In a further aspect, the driving shaft is connected with a driving portion, and the chain is connected to the driving portion and is driven by the driving portion to cut a workpiece.

In a further aspect, the output shaft is supported by a first bearing, and the first bearing is disposed in the accommodation portion and is fixed to the housing through a fixed end disposed inside the housing.

In a further aspect, the fixed end is disposed inside the housing and does not protrude from an outer surface of the housing.

In a further aspect, in a linear direction perpendicular to the plane of the bottom plate, the housing has a projection on the plane of the bottom plate, and in a linear direction parallel to a second straight line, the projection is in the region where the bottom plate is located.

In a further aspect, in a linear direction perpendicular to the plane of the bottom plate, the distance between the shaft center of the driving shaft and the plane of the bottom plate is greater than or equal to 90 mm and less than or equal to 100 mm.

In a further aspect, in a linear direction perpendicular to the plane of the bottom plate, the length from the driving shaft to the plane of the bottom plate is less than or equal to the length from the motor to the plane of the bottom plate.

In a further aspect, a cutting device includes: a housing formed with a handle portion and an accommodation portion; a cutting portion connected to the housing and at least partially disposed in the accommodation portion; a motor disposed in the accommodation portion and used for driving the cutting portion; a bottom plate used for mounting the housing; and a first auxiliary handle connected to the housing. The cutting portion includes: a chain, and a guide plate connected to the housing and used for supporting the chain. The cutting device further includes a lubricating device for lubricating the cutting portion; the lubricating device includes an oil pot; the housing is formed with a first mounting portion for mounting the oil pot, and the oil pot is disposed between the first auxiliary handle and the bottom plate.

In a further aspect, the cutting device further includes a protective cover for fixing the oil pot, and the protective cover surrounds the oil pot and covers at least part of the oil pot; the protective cover is connected to the housing.

In a further aspect, the first mounting portion extends in a plane parallel to the plane of the bottom plate, and the first mounting portion is located between the first auxiliary handle and the bottom plate.

In a further aspect, the cutting device further includes a cover body for at least partially enclosing the driving portion and the chain, and the cover body at least partially communicates with the housing.

In a further aspect, a chip removal channel for chip removal is formed at a communication portion of the cover body and the housing; one end of the chip removal channel extends to the motor, and the other end of the chip removal channel extends to the chip outlet.

In a further aspect, the bottom plate is formed with a first opening for the chain to pass through, and the first opening communicates with the chip removal channel.

In a further aspect the motor is connected with a fan, and the chip removal channel also extends to the fan.

In a further aspect, the lubricating device further includes an oil delivery pipe for connecting the oil pot and an oil pump for pumping oil; one end of the oil delivery pipe is connected to the oil pot, and the other end of the oil delivery pipe is connected to the oil pump and extends from the oil pump to the chain.

In a further aspect, the oil pot is provided with an oil outlet, the oil outlet is connected to the inside of the oil pot through a flexible pipe, and an oil inlet end is provided at the other end of the flexible pipe. The density of the oil inlet end is greater than the density of the oil, so that the oil inlet is submerged in the oil under the action of gravity.

In a further aspect, the housing is formed with a connection port penetrating through the housing itself, one end of the connection port is connected to the oil outlet, and the other end of the connection port is connected to the oil delivery pipe.

In further aspect, a cutting device includes: a housing formed with a handle portion and an accommodation portion; a cutting portion at least partially disposed in the accommodation portion; and a motor disposed in the accommodation portion and used for driving the cutting portion. The cutting portion includes a chain; and a guide plate connected to the housing and used for supporting the chain. The cutting portion is further connected with a knife following plate for protecting a user; the knife following plate further includes a protective cover for covering at least part of the end of the guide plate; the protective cover further includes an adjusting member; the adjusting member has a first position and a second position relative to the guide plate; when the adjusting member is in the first position, the knife following plate is connected to the guide plate as a whole through the adjusting member; when the adjusting member is in the second position, the knife following plate is separated from the guide plate.

In a further aspect, the knife following plate extends along a direction of the guide plate and is fixedly connected to or integrally formed with the protective cover, and the adjusting member is detachably connected to the protective cover.

In a further aspect, the knife following plate is disposed on a side facing away from the cutting direction and offset from the guide plate.

In a further aspect, in a linear direction extending along the cutting direction, the minimum distance between the knife following plate and the chain is greater than or equal to 6 mm and less than or equal to 18 mm.

In a further aspect, the protective cover is formed with a receiving cavity, and the receiving cavity is formed with an opening that communicates with the outside and that is used for discharging dust.

In a further aspect, the adjusting member is connected to the protective cover through a mounting hole disposed on the protective cover, and is at least partially disposed in the receiving cavity.

In a further aspect, the adjusting member includes an adjusting shaft and a reinforcing ring, the reinforcing ring is formed with a through hole through which the adjusting shaft can pass, and the reinforcing ring is used for strengthening the strength of the region where the adjusting member is mounted in the protective cover.

In a further aspect, the adjusting member includes an elastic member which is disposed between the adjusting shaft and the reinforcing ring to provide a pre-tensioning force.

In a further aspect, the adjusting member further includes a buckle for being fixedly connected to the protective cover, and when the adjusting member is in the second position, the buckle is capable of preventing the adjusting shaft from being detached from the protective cover.

In a further aspect, a boss is formed or connected on the protective cover at a position corresponding to the adjusting member, and when the adjusting member is in the first position, the boss and the adjusting member at least partially overlap with each other along the extending direction of the adjusting member.

In a further aspect, a cutting device includes: a housing formed with a handle portion and an accommodation portion; a cutting portion at least partially disposed in the accommodation portion; and a motor disposed in the accommodation portion and used for driving the cutting portion. The cutting portion includes: a chain; and a guide plate connected to the housing and used for supporting the chain. The housing is further connected with a knife following plate for protecting a user; the cutting portion further includes a supporting plate for supporting the guide plate to be connected to the housing; the supporting plate is formed or connected with a positioning portion for guiding the guide plate away from the knife following plate to a preset distance.

In a further aspect, the supporting plate is symmetrical about a symmetrical straight line passing through the supporting plate itself, and the positioning portion is symmetrical about a central axis passing through the positioning portion itself; the symmetrical straight line is parallel to and does not coincide with the central axis.

In a further aspect, the supporting plate is symmetrical about a symmetrical straight line passing through the supporting plate itself, and the positioning portion is symmetrical about a central axis passing through the positioning portion itself; in a linear direction which is perpendicular to the symmetrical straight line and the central axis simultaneously, the distance between the symmetrical straight line and the central axis is greater than or equal to 0.1 mm.

In a further aspect, the supporting plate is symmetrical about a symmetrical straight line passing through the supporting plate itself, and the positioning portion is symmetrical about a central axis passing through the positioning portion itself; in a linear direction extending along the cutting direction, the distance between the part of the positioning portion facing towards the cutting direction and the symmetrical straight line is L1, the distance between the part of the positioning portion facing away from the cutting direction and the symmetrical straight line is L2, and L1 is greater than L2.

In a further aspect, the central axis is located on a side of the symmetrical straight line facing away from the knife following plate.

In a further aspect, the knife following plate is located on a side of the guide plate facing away from the cutting direction.

In a further aspect, the positioning portion is a protrusion protruding from a plane on which the supporting plate is located, and the guide plate further includes a clamping slot that is clamped to the positioning portion.

In a further aspect in a linear direction extending along the cutting direction, the minimum distance from the knife following plate to the chain is greater than or equal to 6 mm and less than or equal to 18 mm.

In a further aspect, the supporting plate is symmetrical about a symmetrical straight line passing through the supporting plate itself, the supporting plate has a first positioning hole and a second positioning hole for positioning the supporting plate itself, and the first positioning hole and the second positioning hole are both symmetrically disposed about the symmetrical straight line.

In a further aspect, in the extending direction of the symmetrical straight line, the first positioning hole is far from the second positioning hole.

In a further aspect, a cutting device includes: a housing formed with a handle portion and an accommodation portion; a cutting portion connected to the housing and at least partially disposed in the accommodation portion; a motor disposed in the accommodation portion and including an output shaft driving the cutting portion; and a bottom plate for mounting the housing. The cutting portion includes: a chain for cutting a workpiece; and a guide plate connected to the housing and used for supporting the chain. The cutting device further includes a base for accommodation, the base has a bearing surface, and the cutting device is accommodated on the base along a first assembly direction parallel to a bearing surface.

In a further aspect, when the cutting device is accommodated on the base in the first assembly direction parallel to the bearing surface, the bottom plate is at least partially attached to the bearing surface.

In a further aspect, when the cutting device is accommodated on the base in the first assembly direction parallel to the bearing surface, the center of gravity of the whole formed by the cutting device and the base is close to the base or is located in the base.

In a further aspect, a bearing portion is formed with the bearing surface; the supporting portion is used for supporting the bearing portion; a base substrate extends in a first plane substantially parallel to the horizontal plane and is used for mounting the bearing portion and the supporting portion.

In a further aspect, in a second plane which is perpendicular to the first plane and the output shaft direction simultaneously, the projection of the base substrate on the second plane along the extension direction of the output shaft is substantially triangular.

In a further aspect, the base substrate is formed with an accommodating portion for accommodating a scabbard.

In a further aspect, the base is formed with a protrusion protruding from the first plane, and the protrusion cooperates with the supporting portion to form a clamping slot for the scabbard to be inserted into, and the clamping slot forms the accommodating portion.

In a further aspect, locking devices for locking the cutting device are further disposed on the bearing surface, and the locking devices are disposed on two sides of the bearing surface and are arranged in a staggered manner.

In a further aspect, the base is further formed with a notch for receiving the cutting portion, and when the cutting device is accommodated on the base along a first assembly direction parallel to the bearing surface, the cutting portion is at least partially located inside the notch.

In a further aspect, when the cutting device is accommodated on the base in a first assembly direction parallel to the bearing surface, the bottom plate is parallel to the bearing surface.

In a further aspect, a cutting device includes: a housing formed with a handle portion and an accommodation portion; a cutting portion connected to the housing and at least partially disposed in the accommodation portion; a motor disposed in the accommodation portion and including an output shaft extending in a first linear direction; and a bottom plate for mounting the housing. The cutting device further includes a driving shaft extending in a second linear direction. The cutting portion includes a chain for cutting a workpiece and a guide plate connected to the housing and used for supporting the chain; the cutting portion is connected to the driving shaft, the driving shaft includes a driving portion which may be connected to the chain, and the driving shaft is further provided with a limiting member that limits the movement of the chain in the second linear direction.

In a further aspect, the driving portion has a tooth groove extending along the second linear direction, and a width of the tooth groove in the second linear direction is greater than a width of the chain in the second linear direction.

In a further aspect, the limiting member is formed with a limiting portion that cooperates with the tooth groove.

In a further aspect, the limiting member has a first surface close to the driving portion and a second surface away from the driving portion, and the second surface protrudes toward the first surface to form the limiting portion.

In a further aspect, the number of tooth grooves is greater than or equal to the number of limiting portions.

In a further aspect, after the limiting portions are connected to the tooth grooves, the displacement of the chain moving in the second linear direction is smaller than the width of the tooth groove in the second linear direction.

In a further aspect, the limiting portion is smooth and continuous, and the chain can pass over the limiting portion around the second linear direction.

In a further aspect, the output shaft transmits power to the driving shaft through a worm gear and worm structure.

In a further aspect, the first linear direction is perpendicular to or intersects the second linear direction.

In a further aspect, the cutting device further includes a collar for fixing the limiting member to the driving shaft.

In a further aspect, a cutting device includes: a housing formed with a handle portion and an accommodation portion; a cutting portion at least partially connected to the accommodation portion; a motor disposed in the accommodation portion and used for driving the cutting portion; a bottom plate for mounting the housing; and an auxiliary handle connected to the bottom plate. The cutting portion includes a chain for cutting a workpiece and a guide plate connected to the housing and used for supporting the chain. The bottom plate is formed with or connected with a mounting portion for mounting the auxiliary handle and a storage portion for storing the auxiliary handle; the mounting portion is disposed on a front side of the bottom plate in a cutting direction and is away from the cutting portion.

In a further aspect, the auxiliary handle is disposed on an end of the bottom plate facing away from the handle portion.

In a further aspect, the mounting portion is formed with a connection hole for mounting the auxiliary handle, and in the cutting direction, the minimum linear distance from the circle center of the connection hole to the chain is greater than or equal to 120 mm.

In a further aspect, the mounting portion is detachably connected to the bottom plate.

In a further aspect, in the cutting direction, the storage portion is located at one end of the bottom plate facing away from the handle portion, and is located on one side facing away from the mounting portion.

In a further aspect, the storage portion is deviated from the chain in a linear direction perpendicular to the cutting direction.

In a further aspect, when the auxiliary handle is mounted to the mounting portion, the auxiliary handle cooperates with the bottom plate to form an anti-fall surface perpendicular to the cutting direction.

In a further aspect, in the cutting direction, the anti-fall surface is located on a front side of the housing and the cutting portion.

In a further aspect, the storage portion is detachably connected to the bottom plate.

In a further aspect, in the cutting direction, the handle portion and the mounting portion are disposed on two sides of the chain.

In a further aspect, a cutting device includes: a housing formed with a handle portion and an accommodation portion; a cutting portion at least partially connected within the accommodation portion; a motor disposed in the accommodation portion and used for driving the cutting portion; and a bottom plate extending in a plane of the bottom plate and used for mounting the housing. The cutting portion includes a chain for cutting a workpiece and a guide plate connected to the housing and used for supporting the chain. The bottom plate is connected with a pressing plate for pressing a cutting surface, the pressing plate has a slider parallel to the chain; along a linear direction perpendicular to a plane of the guide plate, the slider has a first adjusting position and a second adjusting position relative to the chain; when the slider is in the first adjusting position relative to the chain, the slider is close to the chain; when the slider is in the second adjusting position relative to the chain, the slider is away from the chain.

In a further aspect, the cutting portion is connected to the driving shaft; the pressing plate has a connection port connected to the bottom plate, and the connection port extends in a direction parallel to the driving shaft.

In a further aspect, the pressing plate is detachably connected to the bottom plate through a fixing member, the fixing member is disposed inside the connection port, and the connection port is in a slot shape.

In a further aspect, the connection port extends along a linear direction perpendicular to a plane where the guide plate is located.

In a further aspect, within the range of the connection port, the pressing plate is capable of switching freely between the first adjusting position and the second adjusting position.

In a further aspect, the pressing plate extends in a plane parallel to the plane of the bottom plate, and the slider protrudes from a plane where the pressing plate is located and is integrally formed with the pressing plate.

In a further aspect, the slider extends from a side of the pressing plate facing towards the guide plate, and an angle exists between the slider and the plane where the pressing plate is located.

In a further aspect, the slider is smooth and continuous, and has an end surface parallel to the guide plate.

In a further aspect, the pressing plate is formed with or connected with a slide rail capable of achieving displacement between the first adjusting position and the second adjusting position, and the slide rail extends along a linear direction perpendicular to the plane where the guide plate is located.

In a further aspect, when the slider is in the first adjusting position relative to the chain, the slider is at least partially parallel to the chain along a linear direction perpendicular to the plane of the guide plate.

In a further aspect, a cutting device includes: a housing formed with a handle portion and an accommodation portion; a cutting portion at least partially connected within the accommodation portion; a motor disposed in the accommodation portion and used for driving the cutting portion; and a bottom plate located on the lower side of the housing and used for mounting the housing. The cutting portion includes a chain for cutting a workpiece and a guide plate extending in an up and down direction, connected to the housing and used to support the chain. The cutting portion is further provided with a tensioning device for tensioning the chain to the guide plate; the tensioning device extends in a direction parallel to an extension direction of the guide plate.

In a further aspect, the tensioning device includes an adjusting rod extending in the up and down direction and a lock pin connected to the adjusting rod, and the lock pin also extends to the guide plate.

In a further aspect, when the adjusting rod rotates in a first direction, the lock pin is driven to move upward, and the upward movement of the lock pin drives the guide plate to tension the chain; when the adjusting rod rotates in a second direction, the lock pin is driven to move downward, and the downward movement of the lock pin drives the guide plate to loosen the chain.

In a further aspect, the cutting device includes a cover body for enclosing at least part of the cutting portion, and the tensioning device is at least partially disposed in the cover body.

In a further aspect, the adjusting rod includes a first end and a second end; the first end is disposed outside the cover body; the second end is disposed inside the cover body.

In a further aspect a part of the adjusting rod close to the second end is formed with a threaded section, and the lock pin is vertically disposed on the threaded section.

In a further aspect, the cutting device further includes an encapsulation member for at least partially encapsulating the cutting portion, and the adjusting rod is fixed to the encapsulation member along a through hole penetrating the encapsulation member from top to bottom.

In a further aspect, the cutting device further includes a supporting plate for supporting the guide plate, and the supporting plate is formed with a positioning portion for positioning the guide plate.

In a further aspect, the supporting plate is formed with a chute through which the lock pin can pass, the lock pin is formed with or connected with an extension section extending to the guide plate in a direction perpendicular to or intersecting the adjusting rod, and the extension section passes through the chute and can move freely in the chute in the up and down direction.

In a further aspect, the guide plate is formed with a through hole for receiving the extension section, and the extension section is connected to the through hole and is capable of driving the guide plate to move up and down along the chute.

The examples briefly presented above are beneficial in that: through setting of a worm gear and worm transmission device in combination with the optimization of the internal structure of the cutting device, the size of the entire cutting device is reduced, and the user experience is improved.

DETAILED DESCRIPTION

Figure 1:
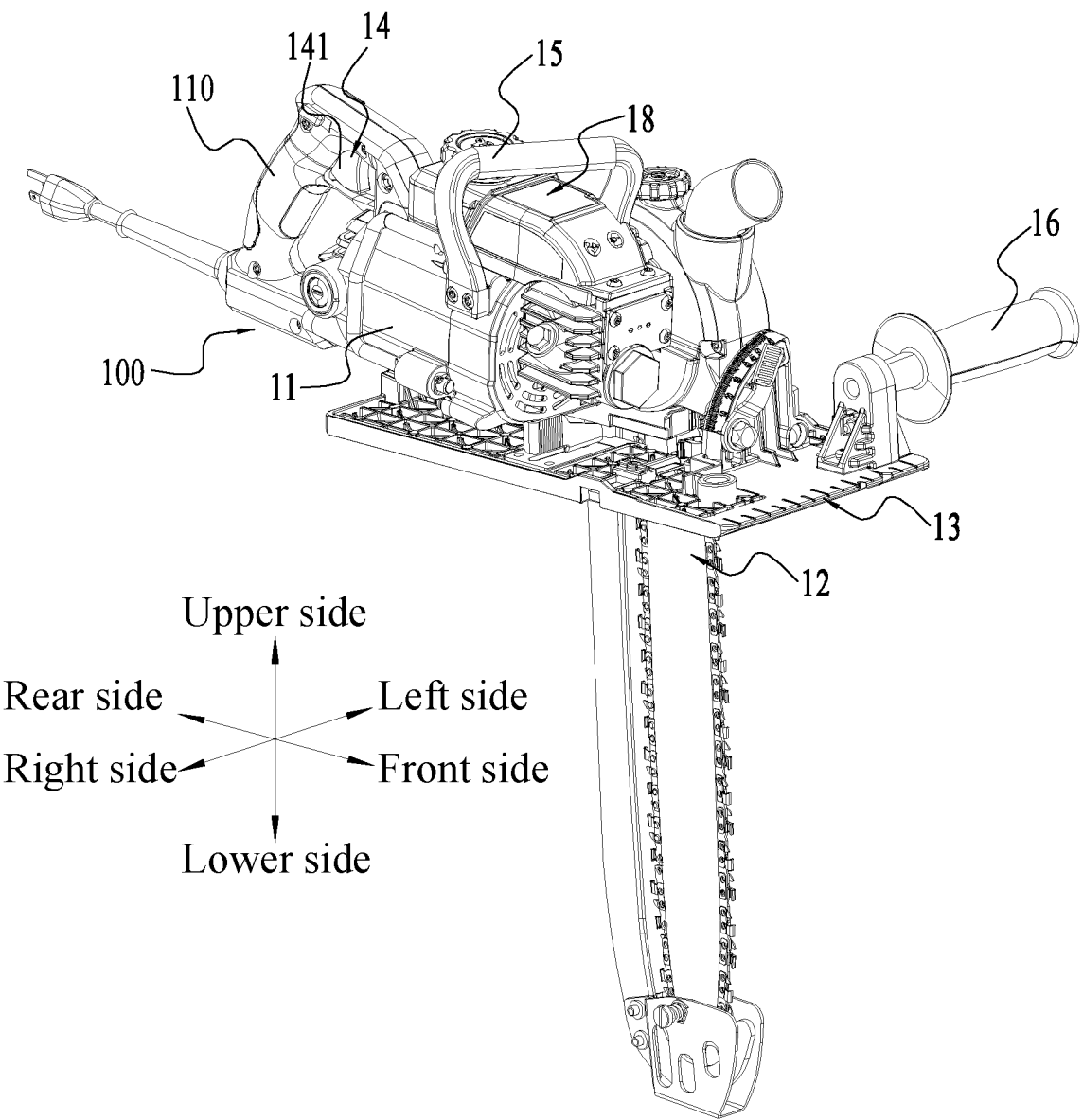
FIG. 1 is a perspective view of a cutting device.
Figure 2:
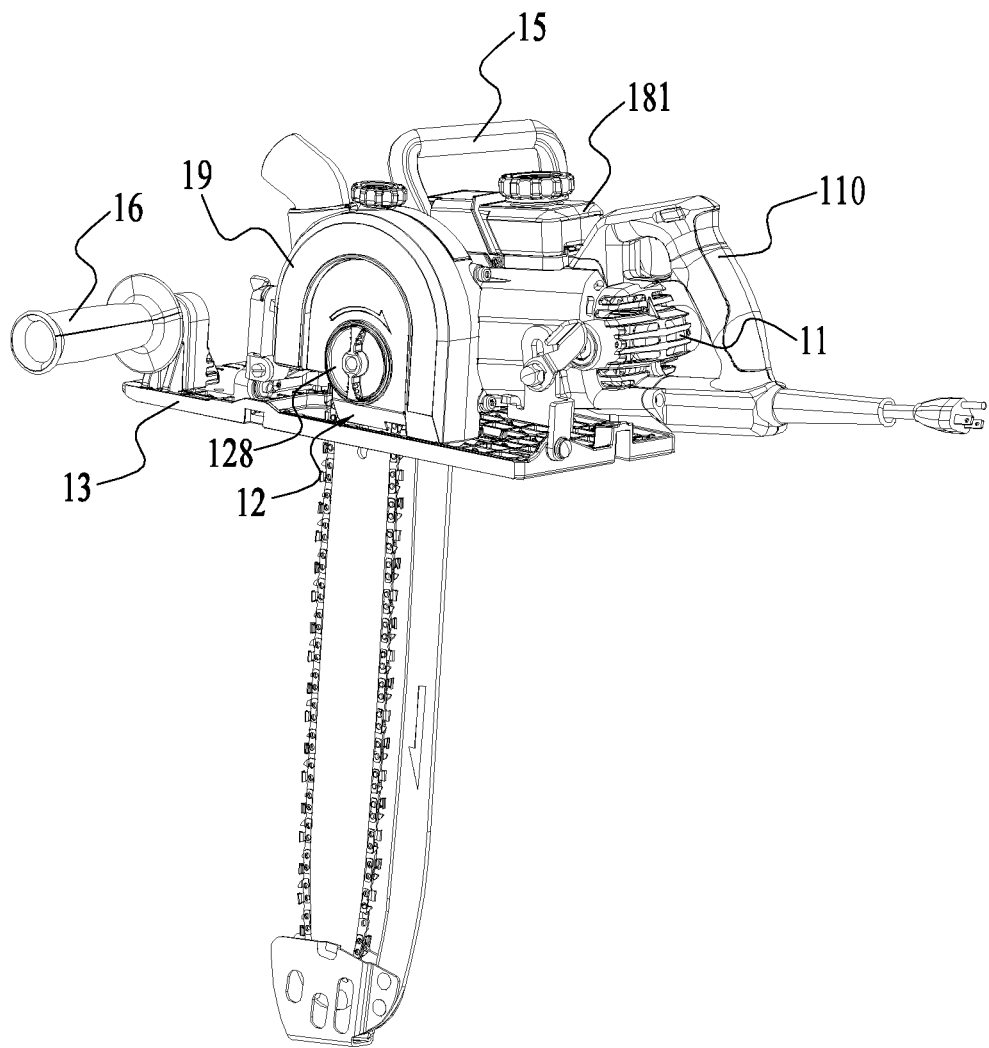
FIG. 2 is a perspective view of the cutting device of FIG. 1 from another view.
Figure 3:
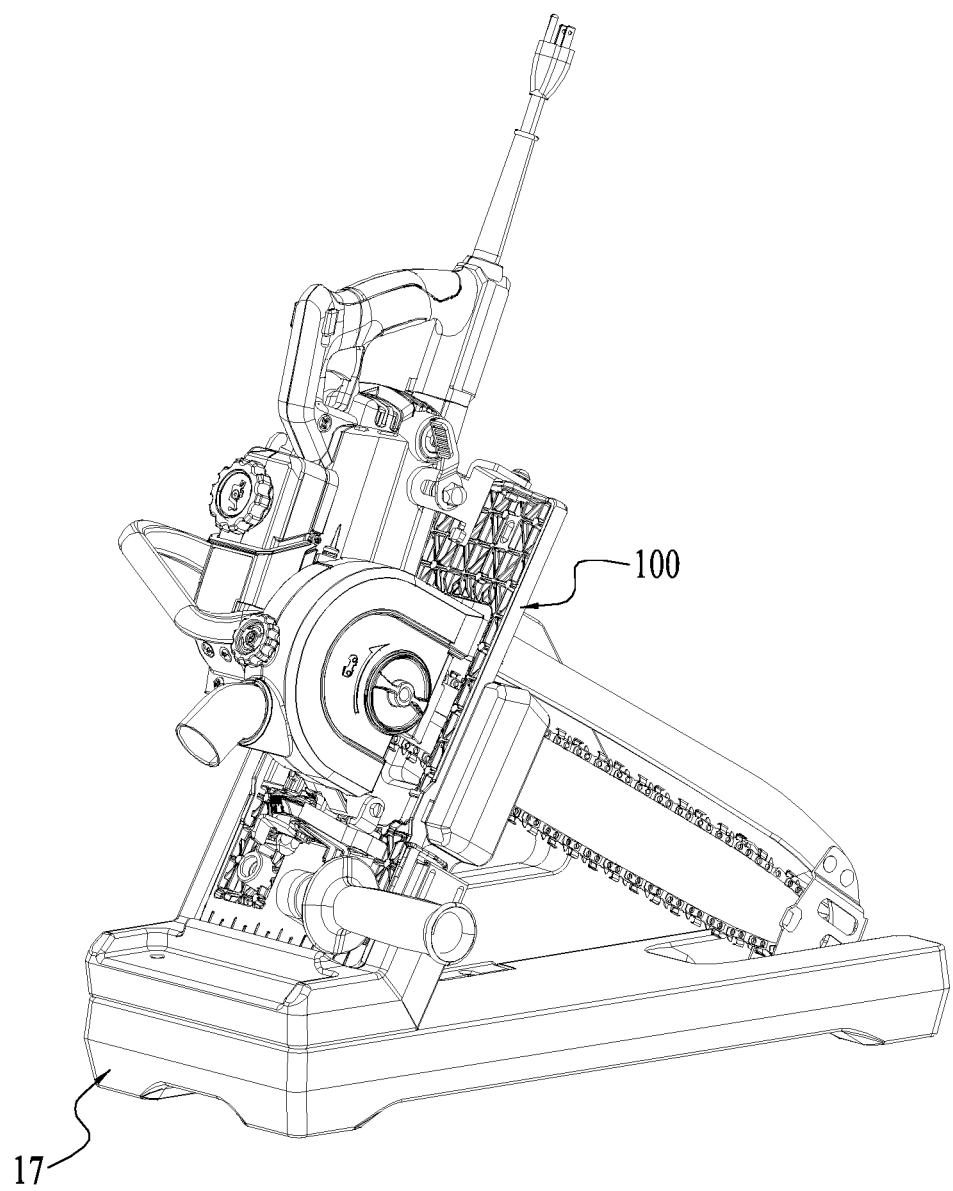
FIG. 3 is a perspective view of the cutting device of FIG. 1 accommodated on a base.

As shown in FIGS. 1 to 2, a cutting device 100 includes a housing 11, a cutting portion 12, a bottom plate 13 and a control device 14. The housing 11 is formed with a handle portion 110 and a accommodation portion 111, the handle portion 110 is configured for a user to hold, and the control device 14 is at least partially disposed on the handle portion 110, so that the user can control the cutting device 100. In fact, the control device 14 includes components such as a trigger 141 and a circuit board, which are arranged inside or outside the housing 11. The accommodation portion 111 is formed with a first receiving cavity 119 which can receive other components involved in the cutting work. For example, the first receiving cavity 119 may receive at least part of the cutting portion 12. In this example, the cutting device 100 is driven by a motor 112, and the motor 112 is disposed in the first receiving cavity 119. Of course, the cutting device 100 further includes a circuit board electrically connected to the motor 112, and the circuit board may also be disposed in the first receiving cavity 119. In order to clearly illustrate the technical solution described herein, as shown in FIG. 1, six directions of front side, rear side, left side, right side, upper side, and lower side are also defined. The housing 11 is mounted on the bottom plate 13, and the cutting portion 12 passes through the bottom plate 13 to be connected to the housing 11. In this example, the bottom plate 13 extends in a plane of the bottom plate perpendicular to an up and down direction. The housing 11 is further connected with or formed with a first auxiliary handle 15 for a user to hold, when the user operates the cutting device 100, the user holds the handle portion 110 with one hand and holds the first auxiliary handle 15 with the other hand to perform the cutting operation. The first auxiliary handle 15 is disposed at an intermediate position in the front and rear direction of the housing 11. The bottom plate 13 is further connected with or formed with a second auxiliary handle 16, the second auxiliary handle 16 may also be used for a user to operate and the cutting device 100 is operated in another holding manner.

As shown in FIGS. 3 to 7, the cutting device 100 may be accommodated on a base 17 for storage. Specifically, the base 17 includes a base body 171, a bearing portion 172, and a supporting portion 173. The base body 171 may be horizontally placed on a plane such as a workbench or the ground, and the bearing portion 172 and the supporting portion 173 are mounted on the base body 171. The bearing portion 172 is used for directly bearing and accommodating the cutting device 100, and the base body 171 includes a first plane 101 that is substantially parallel to the horizontal plane, the bearing portion 172 is formed with a bearing surface 172a for bonding with the bottom plate 13 to bear the cutting device 100.

As shown in FIGS. 4 to 7, the main body part of the bearing portion 172 extends substantially along a plane that obliquely intersects the first plane 101, and one end is formed with a connecting end 172b which is substantially parallel to the first plane 101. The connecting end 172b is formed with a protrusion which cooperates with the first groove 171a formed on the base body 171, so that the bearing portion 172 can be substantially fixed at a fixed position of the base body 171. The supporting portion 173 is used for connecting the bearing portion 172 and the base body 171 simultaneously. A side of the bearing portion 172 facing towards the supporting portion 173 is further formed with a second groove 172c, the supporting portion 173 is at least partially embedded in the second groove 172c, so as to fix and support the bearing portion 172. A side of the base body 171 facing towards the supporting portion 173 is formed with a third groove 171b for fixing the supporting portion 173, and the supporting portion 173 is at least partially embedded in the third groove 171b. Thereby, the base body 171 is fixed to the bearing portion 172, the base body 171 is fixed to the supporting portion 173, the bearing portion 172 is fixed to the supporting portion 173, and the base body 171, the bearing portion 172 and the supporting portion 173 are connected to each other and fixed as a whole. The supporting portion 173 is further formed with or connected with locking portions 173a which are locked to the bearing portion 172 and the base body 171 respectively. The locking portions 173a protrude from a plane where a body of the supporting portion 173 is located, and lock the supporting portion 173, the bearing portion 172, and the base body 171 into a whole through locking members such as screws.

The base body 171, the bearing portion 172, and the supporting portion 173 interact with each other, so that the base body 171, the bearing portion 172, and the supporting portion 173 can form a very stable whole in the spliced state. In fact, in a second plane 102 that is simultaneously perpendicular to the first plane 101 and a straight line extending in the left and right direction, the projection of the base 17 on the second plane 102 in the left and right direction is substantially triangular. In the example, the base 17 is further formed with a accommodating portion 171c for accommodating the scabbard 129. The scabbard 129 is used for at least partially covering the cutting portion 12 to prevent the cutting portion 12 from being exposed to the outside in an accommodating state. The accommodating portions 171c are specifically two protrusions formed or connected to the base, and cooperate with the supporting portion 173 to form accommodating slots into which the scabbards 129 can be inserted. It can be understood that the base 17 is not limited to the above-mentioned connection manner, and in some preferred examples, the base 17 may also be integrally formed.

Figure 4:
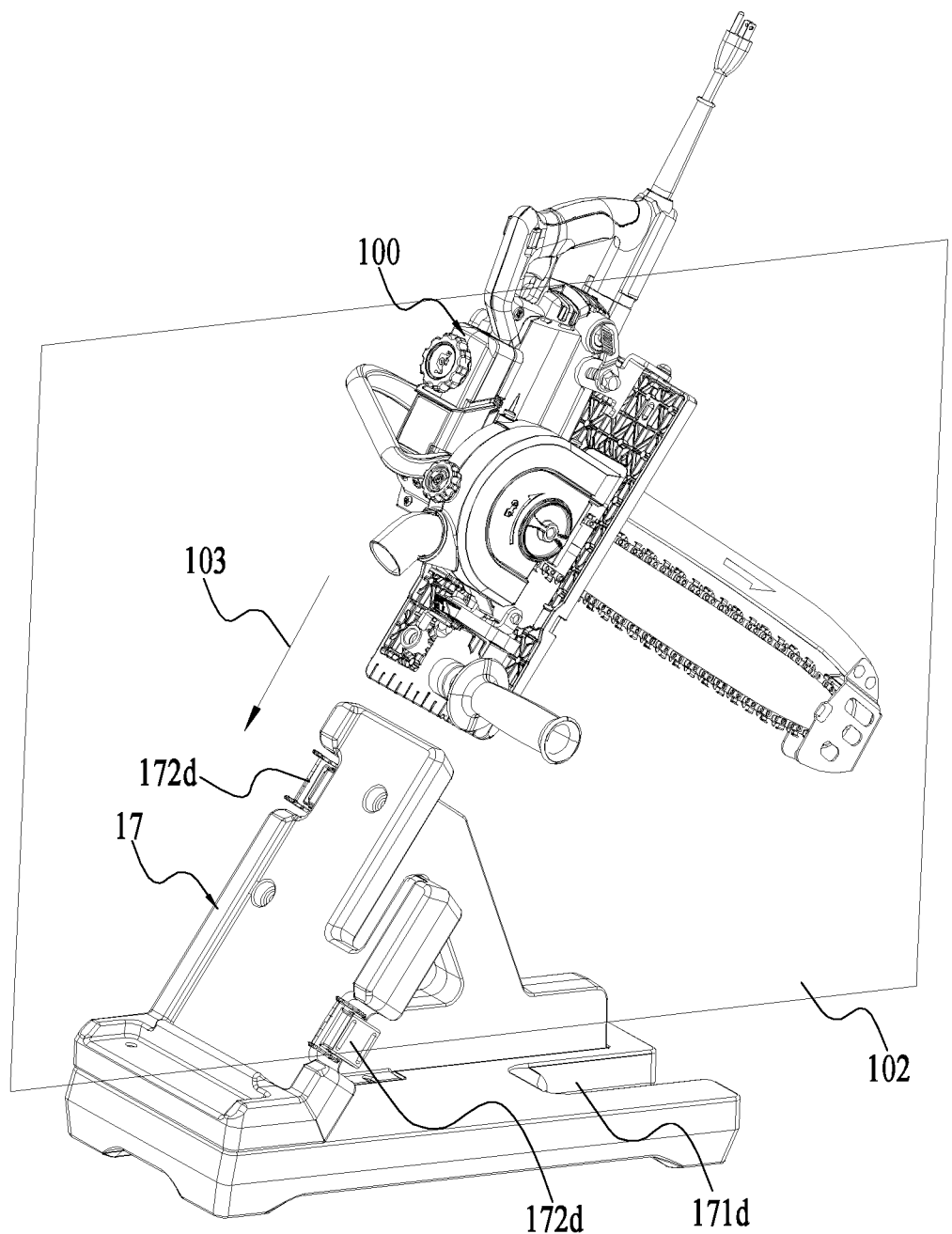
FIG. 4 is an exploded view of the cutting device and the base of FIG. 3.
Figure 5:
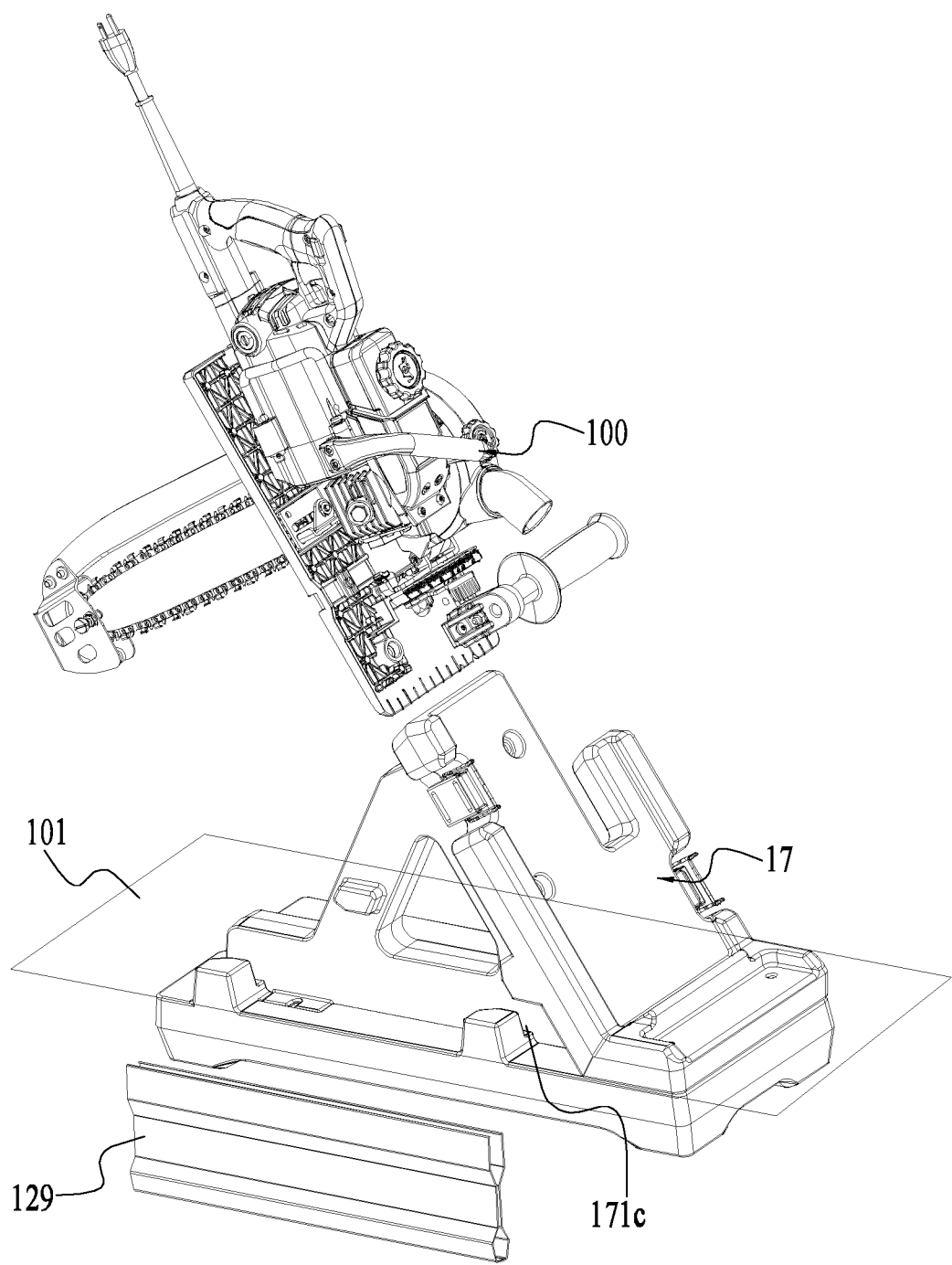
FIG. 5 is an exploded view of the cutting device and the base of FIG. 4 from another view.
Figure 6:
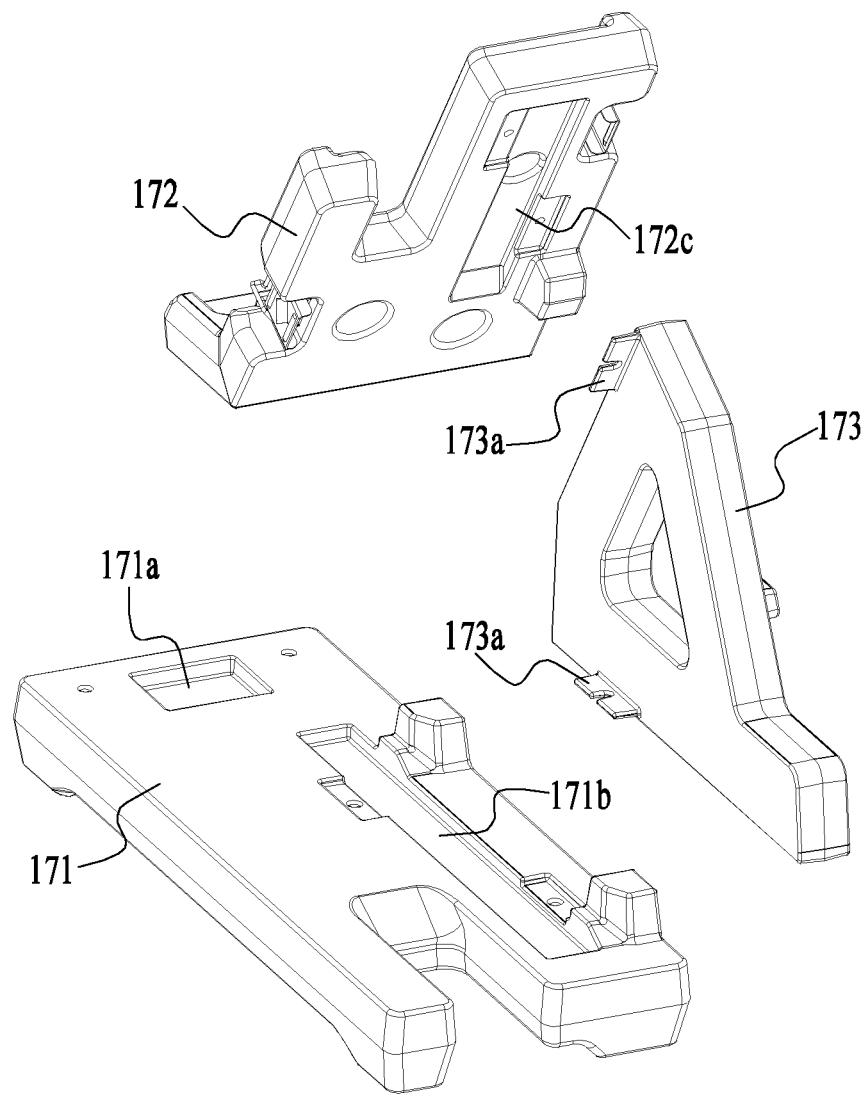
FIG. 6 is an exploded view of the base of FIG. 4.
Figure 7:
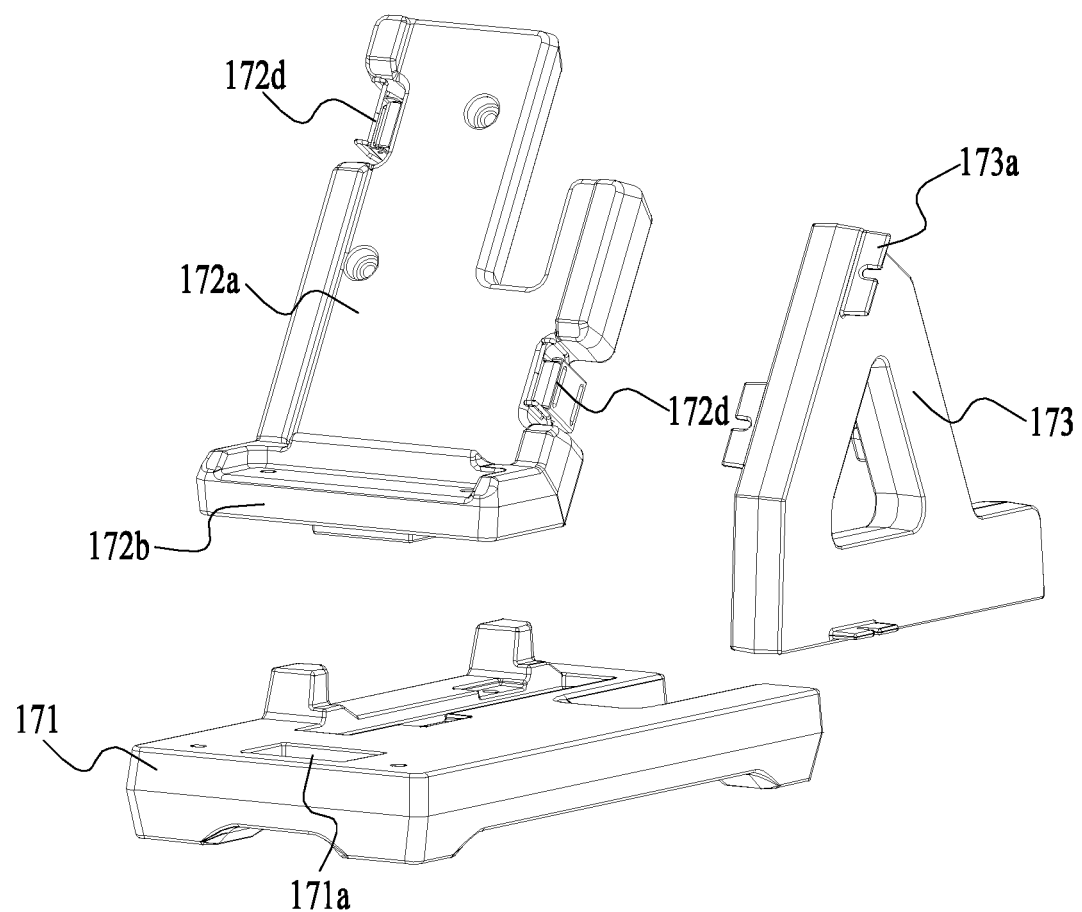
FIG. 7 is an exploded view of the base of FIG. 6 from another view.

When the user needs to accommodate the cutting device 100, the cutting device 100 may be placed on the bearing surface 172a of the bearing portion 172 according to the first assembly direction 103 shown in FIG. 4. When the foremost end of the cutting device 100 slides to the connecting end 172b of the bearing portion 172, the locking device 172d provided on the bearing portion 172 locks the cutting device 100 on the base 17 to complete accommodation. At this time, the center of gravity of the whole formed by the cutting device 100 and the base 17 is close to or within the base 17, so that the whole formed by the cutting device 100 and the base 17 can be more stably placed on the ground or a workbench surface, and is also convenient for packaging and shipping of the cutting device 100. It can be understood that the locking devices 172d are arranged on two sides of the bearing surface 172a and are staggered, so that the cutting device 100 is locked as much as possible. Since the cutting portion 12 of the cutting device 100 is long, the base body 171 is further formed with a notch 171d for receiving at least part of the cutting portion 12. In fact, in the accommodating state, the cutting portion 12 is always located within the notch 171d, and is not in contact with the workbench surface or the ground. In some preferred examples, the locking device 172d may be a buckle. In other examples, the locking device 172d may also be other connecting members capable of achieving a detachable connection manner.

Figure 8:
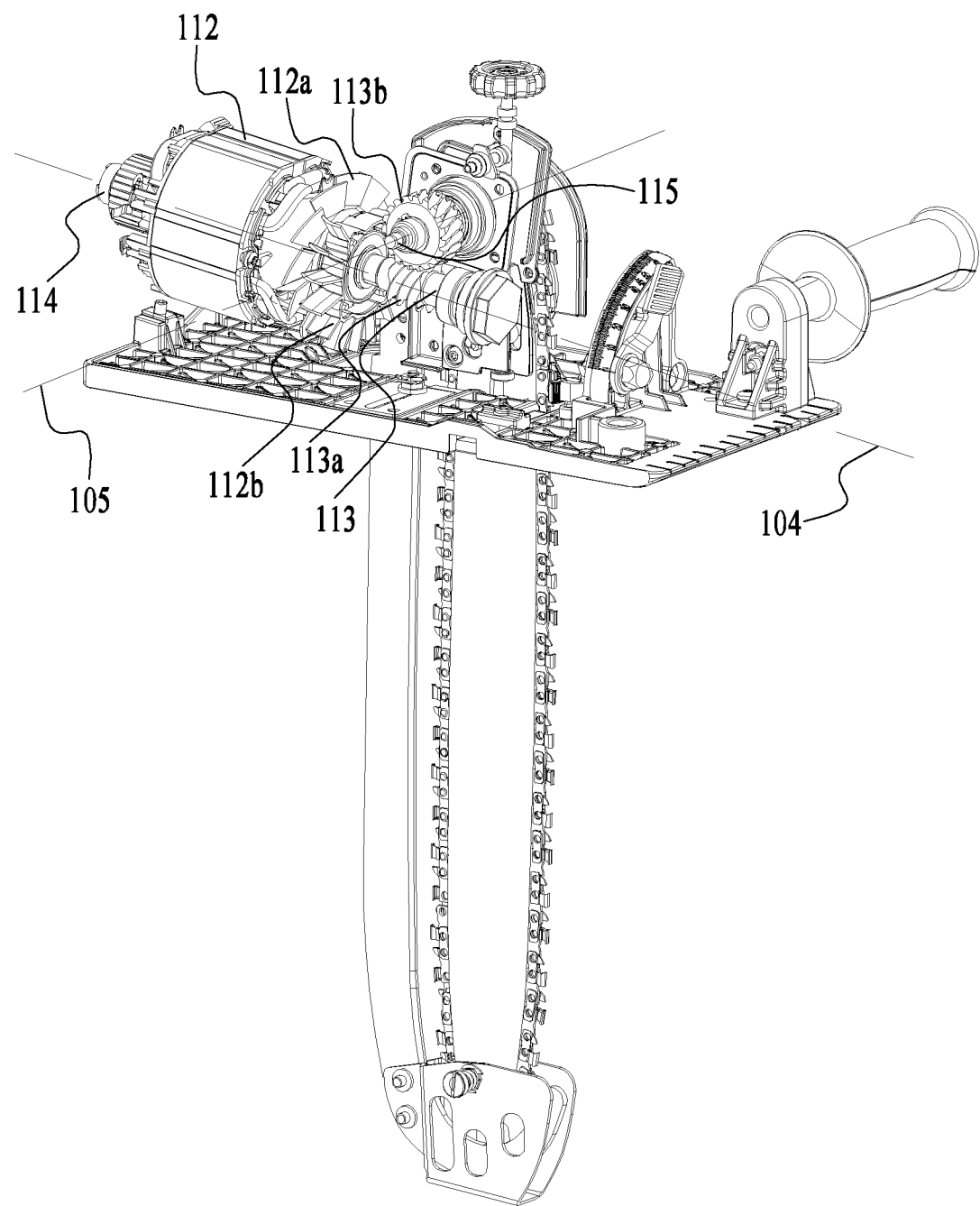
FIG. 8 is a schematic view of an internal structure of the cutting device of FIG. 1.
Figure 9:
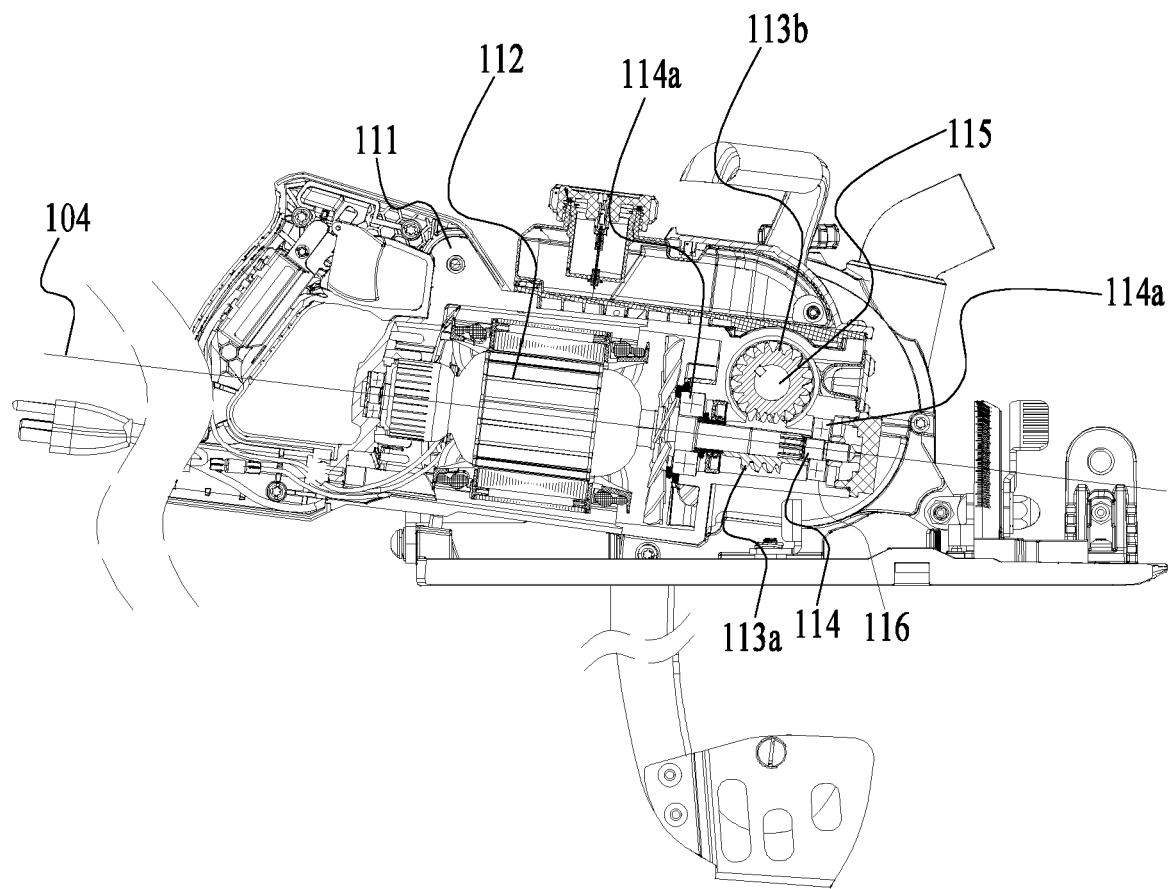
FIG. 9 is a sectional view of the internal structure of the cutting device of FIG. 1.

As shown in FIGS. 8 to 9, a linear direction extending along the front and rear direction is defined as a direction of a first straight line 104, and the motor 112 extends substantially along the direction of the first straight line 104. Specifically, the motor 112, a fan 112a for dissipating heat from the motor 112, and a transmission device 113 connected to the motor 112 are sequentially arranged from the rear to the front and are disposed in the first receiving cavity 119. The fan 112a and the transmission device 113 are sequentially mounted on an output shaft 114, and the output shaft 114 extends in the direction of the first straight line 104 and is substantially parallel to the direction of the first straight line 104. In this example, the output shaft 114 is further connected with a flow guide member 112b for guiding the outflow of heat dissipation air. The flow guide member 112b is located between the fan 112a and the transmission device 113. A linear direction extending in the left and right direction is defined as a direction of a second straight line 105. The transmission device 113 includes a driving shaft 115 that extends substantially along the direction of the second straight line 105. In this example, the transmission device 113 is specifically a worm gear and worm structure. Specifically, the worm 113a is disposed on the output shaft 114, and the worm gear 113b is disposed on the driving shaft 115.

With the worm gear and worm structure, the space occupied by the transmission device 113 can be minimized, and thereby the space for receiving the first receiving cavity 119 of the transmission device 113 is reduced, the volume of the housing 11 is actually reduced and the size of the cutting device 100 is reduced as a whole. In addition, with the worm gear and worm structure, the shaft center of the driving shaft 115 is closer to the plane of the bottom plate in a linear direction perpendicular to the plane of the bottom plate, so that the chain 121 connected to the driving shaft 115 has more parts protruding from the plane of the bottom plate than the chain 121 of the same size, thereby having a greater cutting depth. In fact, in a linear direction perpendicular to the plane of the bottom plate, the distance from the shaft center of the driving shaft 115 to the plane of the bottom plate is greater than or equal to 90 mm and less than or equal to 100 mm. In addition, in a linear direction perpendicular to the plane of the bottom plate, the length from the driving shaft 115 to the plane of the bottom plate is less than or equal to the length from the motor 112 to the plane of the bottom plate, and thereby the transmission distance of the motor 112 is reduced, the size of the first receiving cavity 119 for receiving the transmission device 113 and the motor 112 can be reduced, and the size of the cutting device 100 is further reduced a whole.

It can be understood that the output shaft 114 is supported by a first bearing 114a and rotates at a high speed. In the example, the first bearing 114a disposed on the output shaft 114 is openly disposed in the first receiving cavity 119. That is, the housing 11 does not need to be separately formed with a bearing chamber for receiving the first bearing 114a at an end of the output shaft 114, but only needs to be formed with a fixed end 116 for fixing the first bearing 114a at the position of the first bearing 114a. The fixed end 116 is disposed inside the housing 11 and does not protrude from the outer surface of the housing 11, that is, the fixed end 116 does not form a protrusion on the outer surface of the housing 11. The first bearing 119 is directly disposed in the first receiving cavity 119 and directly exposed to the space of the first receiving cavity 119, and then on the one hand, the lubricating oil for lubricating the internal structure of the first receiving cavity 119 can directly act on the first bearing 114a, which increases the fluidity of the lubricating oil in the first receiving cavity 119 and facilitates the lubrication and heat dissipation of the first bearing 114a, and thereby the utilization rate of the lubricating oil is increased and the temperature of the surface of the housing 11 is reduced as a whole; on the other hand, the housing 11 no longer needs to be separately provided with or formed with a bearing chamber for receiving the bearing, which simplifies the structure of the housing 11, and thereby the volume of the housing 11 is further reduced and the overall size of the cutting device 100 is further reduced as a whole.

Figure 10:
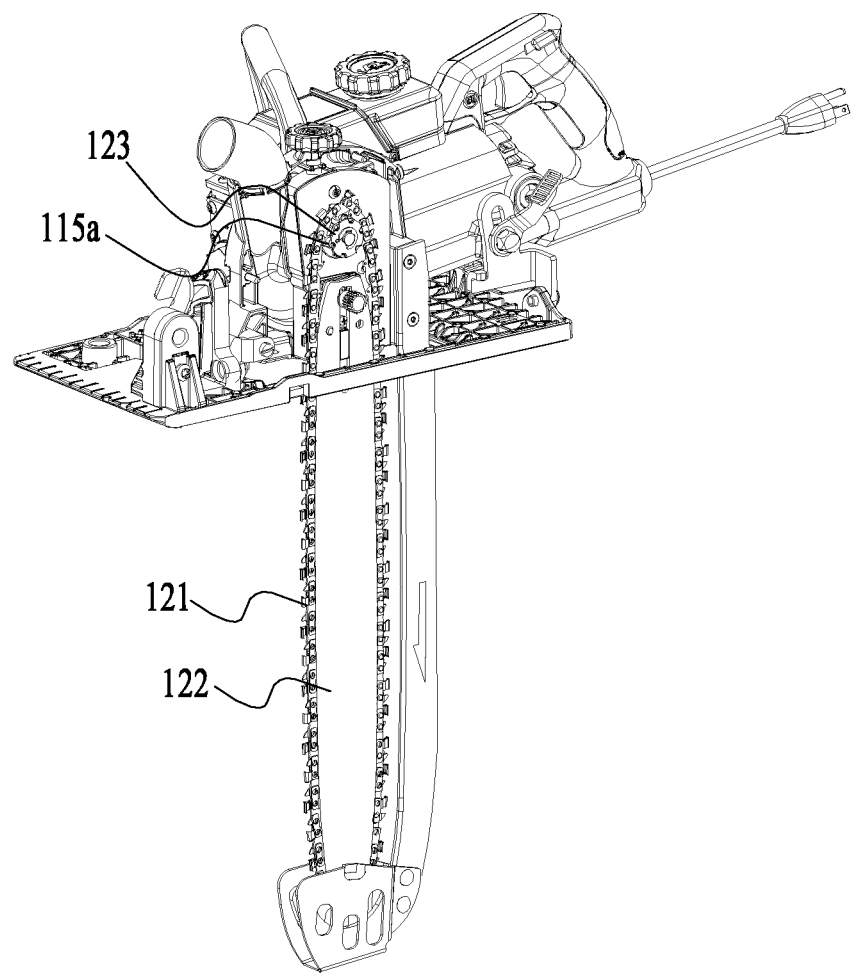
FIG. 10 is a perspective view of the cutting device of FIG. 1 with a cover body removed.
Figure 11:
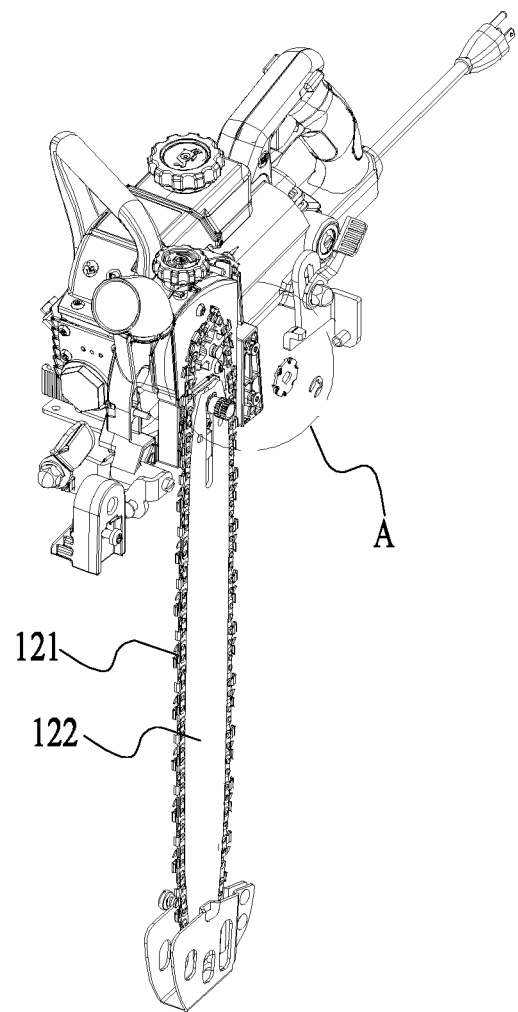
FIG. 11 is an exploded view of a cutting portion of the cutting device of FIG. 10.

As shown in FIGS. 10 to 11, one end of the driving shaft 115 is connected to the worm gear 113b and the other end of the driving shaft 115 is connected to a driving portion 115a. The driving portion 115a can drive the chain 121 to rotate to cut a workpiece. The left side of the housing 11 is further connected with the guide plate 122. The guide plate 122 can support the chain 121, so that the chain 121 rotates around the edge of the guide plate 122 under the driving of the driving portion 115a. After the chain 121 is connected to the driving portion 115a, a relative displacement is generated in the direction of the second straight line 105 for the chain 121 in the working state. In order to prevent the chain 121 from being detached from the driving portion 115a, a limiting member 123 is also provided.

Figure 12:
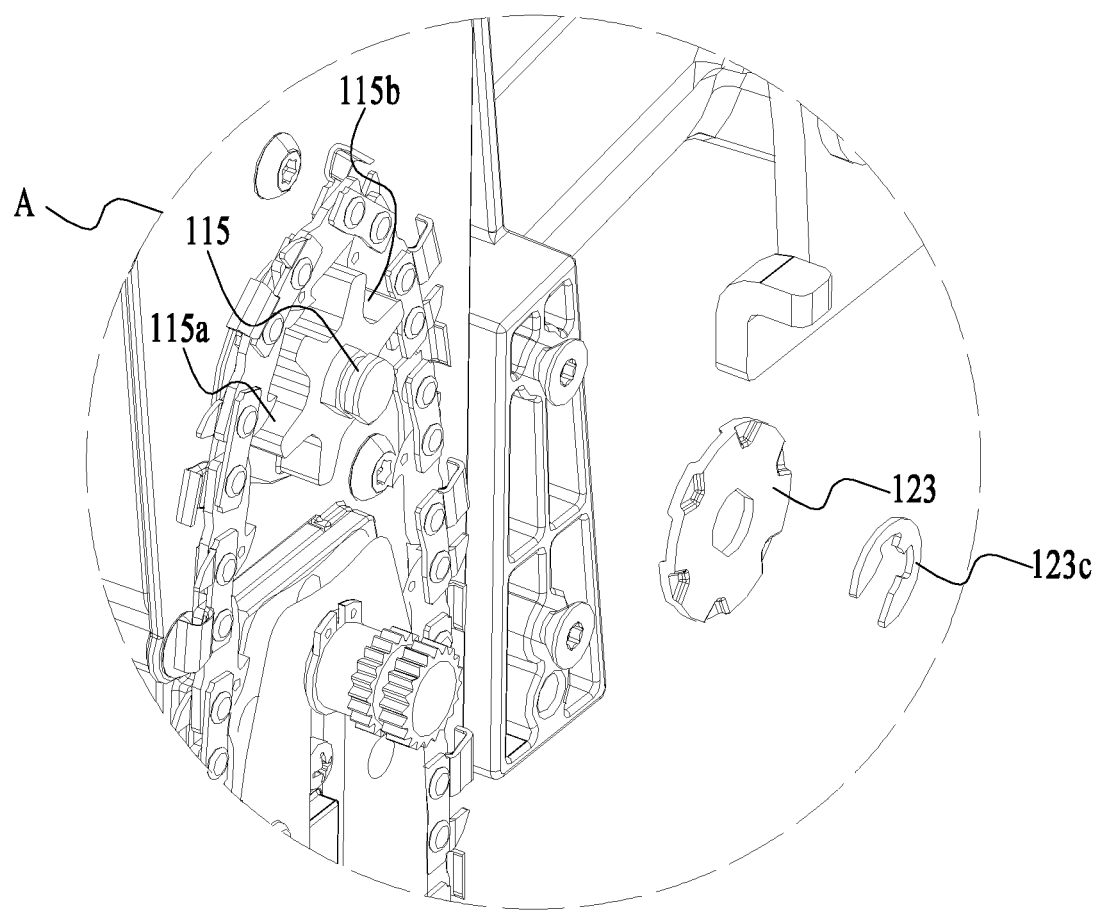
FIG. 12 is a partial enlargement view of the cutting device of FIG. 11 at area A.
Figure 13:
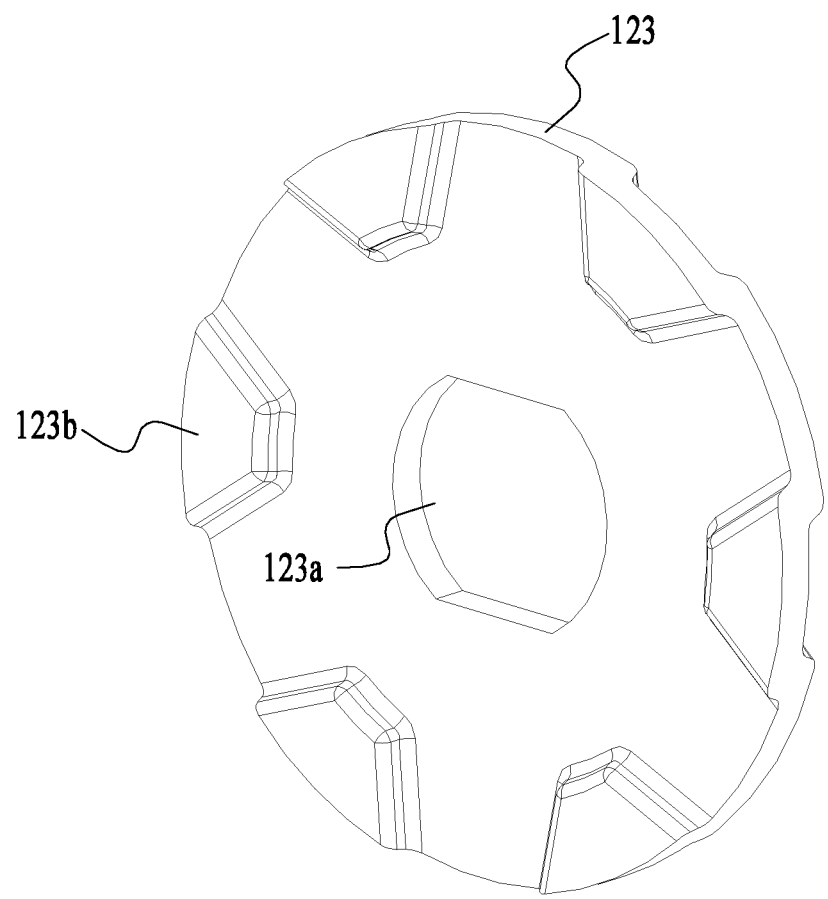
FIG. 13 is a perspective view of a limiting member of the cutting device of FIG. 12.

As shown in FIG. 12, the driving portion 115a is specifically a gear structure, and the width of the tooth groove 115b of the gear in the direction of the second straight line 105 is greater than the width of the chain 121 in the direction of the second straight line 105. When the cutting device 100 is running at a high speed, the chain 121 may shake left and right, and may squeeze the left limiting member 123 simultaneously, which may cause the limiting member 123 to deform. In the case that the limiting member 123 is severely deformed, the chain 121 may be detached from the tooth groove 115b. In this example, the limiting member 123 has a connection hole 123a that can be mounted on the driving shaft 115 from left to right in the direction of the second straight line 105. The connection hole 123a is formed around the driving shaft 115 and is in close contact with the driving portion 115a. The limiting member 123 is formed with a limiting portion 123b that cooperates with the tooth groove 115b. Specifically, as shown in FIG. 13, the limiting member 123 is a disc structure formed around the driving shaft 115. The limiting member 123 has a first surface close to the driving portion 115a and a second surface away from the driving portion 115a. The first surface has a plurality of limiting portions 123b, and the limiting portions 123b are actually protrusions formed by the second surface concaving toward the first surface. When the limiting member 123 is connected to the driving shaft 115, each of the limiting portions 123b is mounted in the tooth groove 115b of the driving portion 115a to form a one-to-one correspondence. It can be understood that the number of limiting portions 123b may also be less than the number of tooth grooves 115b, and it is merely necessary that when the limiting member 123 is mounted, the limiting portions 123b are correspondingly arranged in the tooth grooves 115b. What needs to be explained here is that the correspondence between the limiting portion 123b and the tooth groove 115b refers to that each of the limiting portions 123b can be mounted in the tooth groove 115b, regardless of the relative angular relationship between the limiting portion 123b and the tooth groove 115b when the limiting member 123 is mounted on the driving portion 115a. In order to prevent the limiting member 123 from being detached from the driving shaft 115, a collar 123c is further disposed on the driving shaft 115. The collar 123c is located on the second surface of the limiting member 123. The collar 123c is used for fixing the limiting member 123 and preventing the limiting member 123 from being detached from the driving shaft 115.

When the limiting member 123 is connected to the driving shaft 115 and the limiting potion 123b is mounted in the tooth groove 115b, the limiting potion 123b can shorten the moving distance of the chain 121 along the direction of the second straight line 105 on the driving portion 115a. Therefore, in the working state, the chain 121 is prevented from being detached from the driving portion 115a due to a large axial force caused by a high-speed rotation and an accompanying large vibration. In addition, in order to prevent the limiting potion 123b from limiting the rotation of the chain 121, the surface of the limiting potion 123b is smooth and continuous. Even when the chain 121 is in contact with the limiting potion 123b, the chain 121 can continue to rotate beyond the surface of the limiting portion 123b in a circumferential direction around the second straight line 105.

The cutting device 100 in this example drives, through the driving portion 115a, the chain 121 to rotate to cut the workpiece. The chain 121 rotates around the guide plate 122. The chain 121 needs to be lubricated during the cutting process. As shown in FIGS. 1 and 2, the cutting device 100 lubricates the chain 121 by a lubricating device 18. Specifically, the lubricating device 18 includes an oil pot 181, an oil pump 182, and an oil delivery pipe 183. The oil pot 181 is connected to the oil pump 182 and the oil delivery pipe 183, the oil pump 182 pumps out the oil in the oil pot 181 and delivers the oil to the guide plate 122 or the chain 121 through the oil delivery pipe 183. Specifically, the oil pot 181 is disposed on the upper side of the housing 11 and is in close contact with the housing 11. More specifically, the oil pot 181 is located between the first auxiliary handle 15 and the bottom plate 13. It can be understood that the oil pot 181 may be fixedly connected to or integrally formed with the housing 11. Since the worm gear and worm transmission structure is used, the housing 11 does not need to form a large receiving space, and the space occupied by the housing 11 is small. As a whole, the cutting device 100 has ample space for other components. Therefore, the outer surface of the housing 11 may have a larger space for receiving other accessories.

As shown in FIGS. 14 to 20, the upper side of the housing 11 is formed with a first mounting portion 117, and the oil pot 181 is disposed on the first mounting portion 117. A protective cover 117b is further provided on the upper side of the first mounting portion 117, and the protective cover 117b is disposed around the oil pot 181 and covers at least part of the oil pot 181. Specifically, the first mounting portion 117 extends in a third plane 106 that is parallel to or intersects the plane on which the bottom plate 13 is located, which makes full use of the external space of the housing 11.

In some preferred examples, in order to adapt to the irregular shape of the outer surface of the housing 11, a partition may be further provided on the first mounting portion 117, and a side of the partition facing away from the housing 11 is formed with a mounting surface for directly mounting the oil pot 181. A side of the partition facing toward the housing is further formed with a mounting portion, so as to adapt to the shape of the outer surface of the housing 11 and be fixed to a proper position. The protective cover 117b is formed substantially around the outer wall of the oil pot 181 and is fixed to the housing 11 after covering the oil pot 181. On the one hand, the protective cover 117b can protect the oil pot 181 from being damaged by external forces; on the other hand, the protective cover 117b can effectively fix the oil pot 181 on the first mounting portion 117, so that the hidden danger of oil leakage caused by the oil pot 181 itself provided with a fixing device or a fixing member 232 is avoided. In this example, the oil pot 181 is disposed between the first auxiliary handle 15 and the bottom plate 13 to effectively use the space under the first auxiliary handle 15 on the one hand and protect the oil pot 181 on the other hand. The oil pot 181 is disposed under the first auxiliary handle 15, the oil pot 181 is always maintained in a safer environment, which reduces the chance of the oil pot 181 being damaged. It can be understood that the oil pot 181 may also be disposed at other suitable positions of the housing 11, which will not be repeated here.

Figure 16:
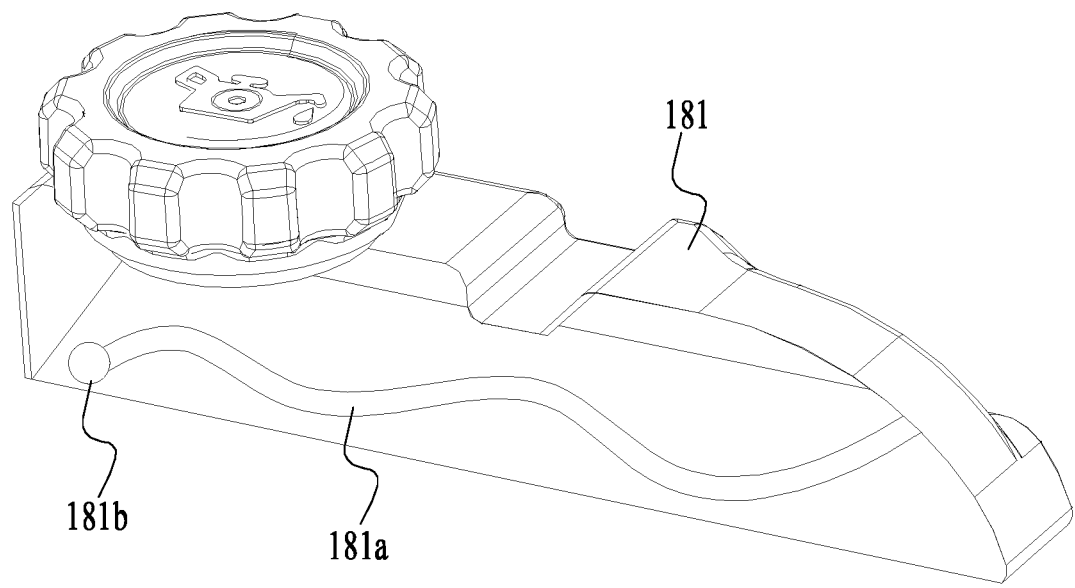
FIG. 16 is a partial sectional view of an oil pot of the cutting device of FIG. 14.

As shown in FIG. 16, in this example, an oil outlet (not shown) is provided on a side of the oil pot 181 facing toward the driving shaft 115, the oil outlet is connected to a pipe 181a, and the pipe 181a is located inside the oil pot 181. Since the user will operate the cutting device 100 in different positions, it is necessary to ensure that the chain 121 is continuously oiled and lubricated, Therefore, the flexible pipe is therefore provided. One end of the pipe 181a is connected to the oil outlet, and the other end of the flexible pipe 181a is connected to an oil inlet 181b. The density of the oil inlet 181b is greater than the density of the oil, and the oil inlet 181b can move freely under the action of gravity to ensure that the oil inlet 181b of the pipe 181a can be submerged in the oil at any angle, thereby ensuring continuous oil pumping.

Figure 14:
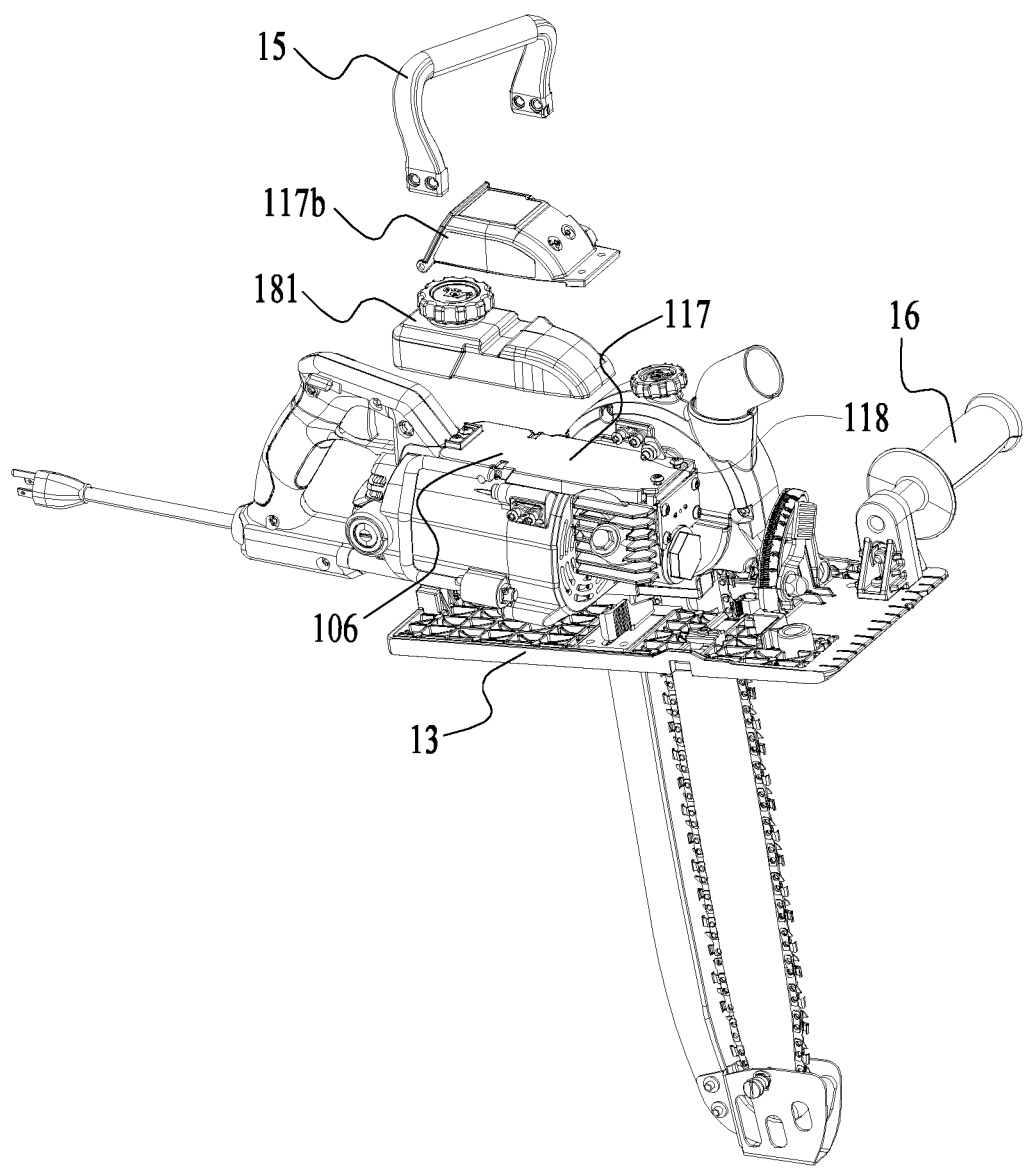
FIG. 14 is an exploded view of a lubricating device of the cutting device of FIG. 1.
Figure 15:
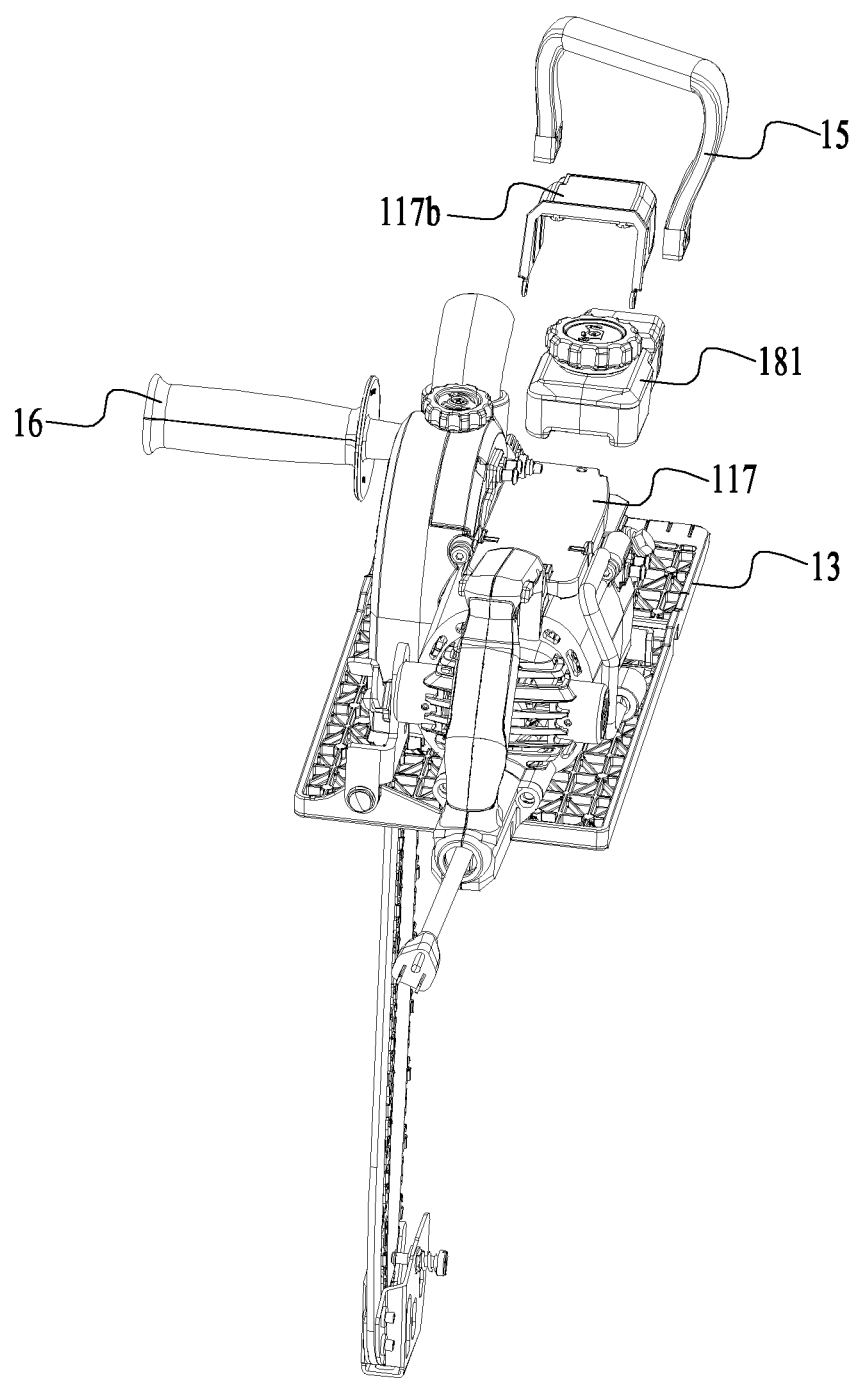
FIG. 15 is an exploded view of the lubricating device of the cutting device of FIG. 14 from another view.
Figure 17:
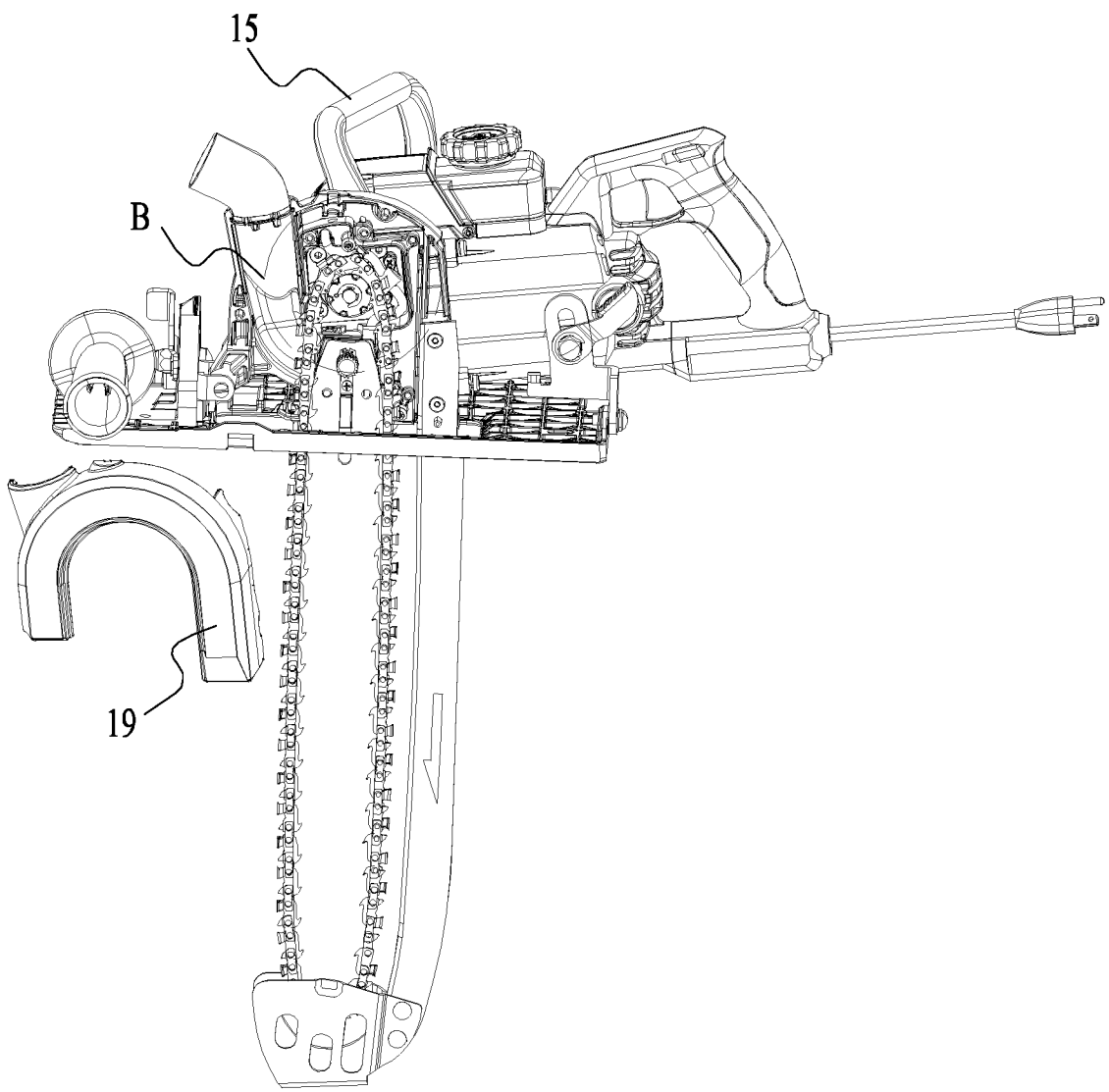
FIG. 17 is a front view of the cutting device of FIG. 1 with a cover body removed.
Figure 18:
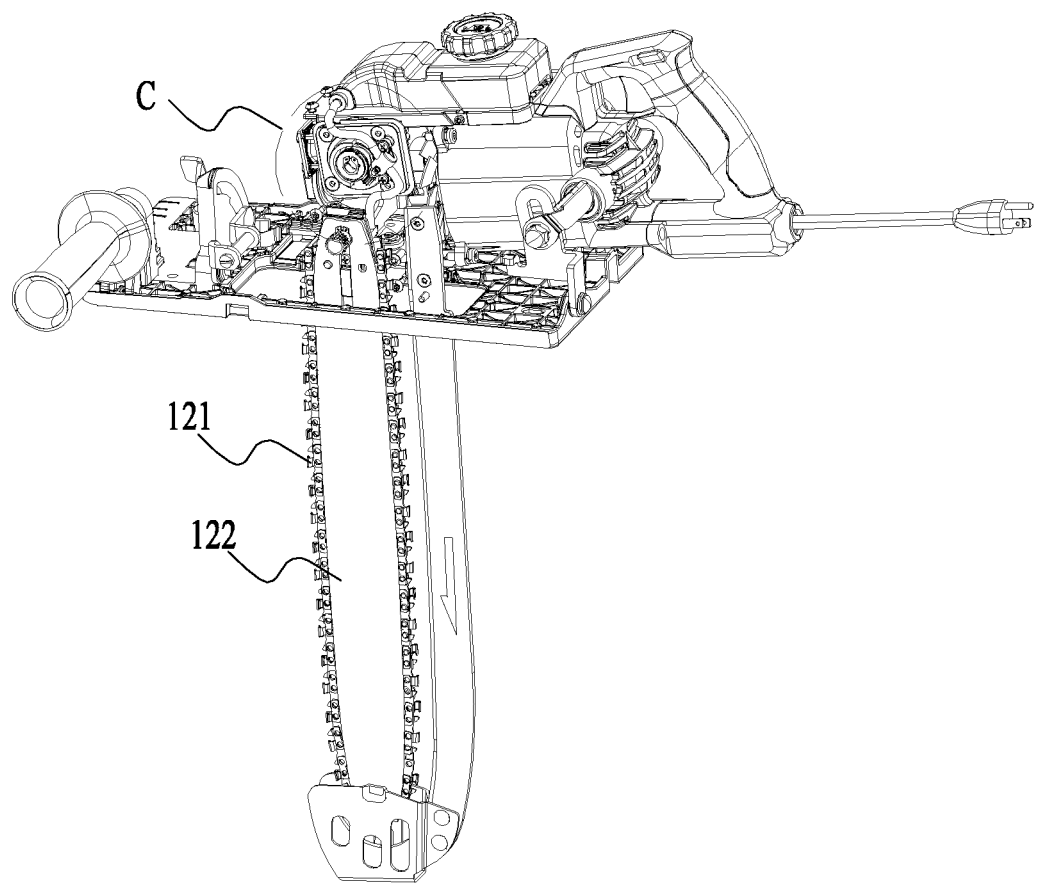
FIG. 18 is a perspective view of the cutting device of FIG. 1 with the cover body and part of a chain removed.
Figure 19:
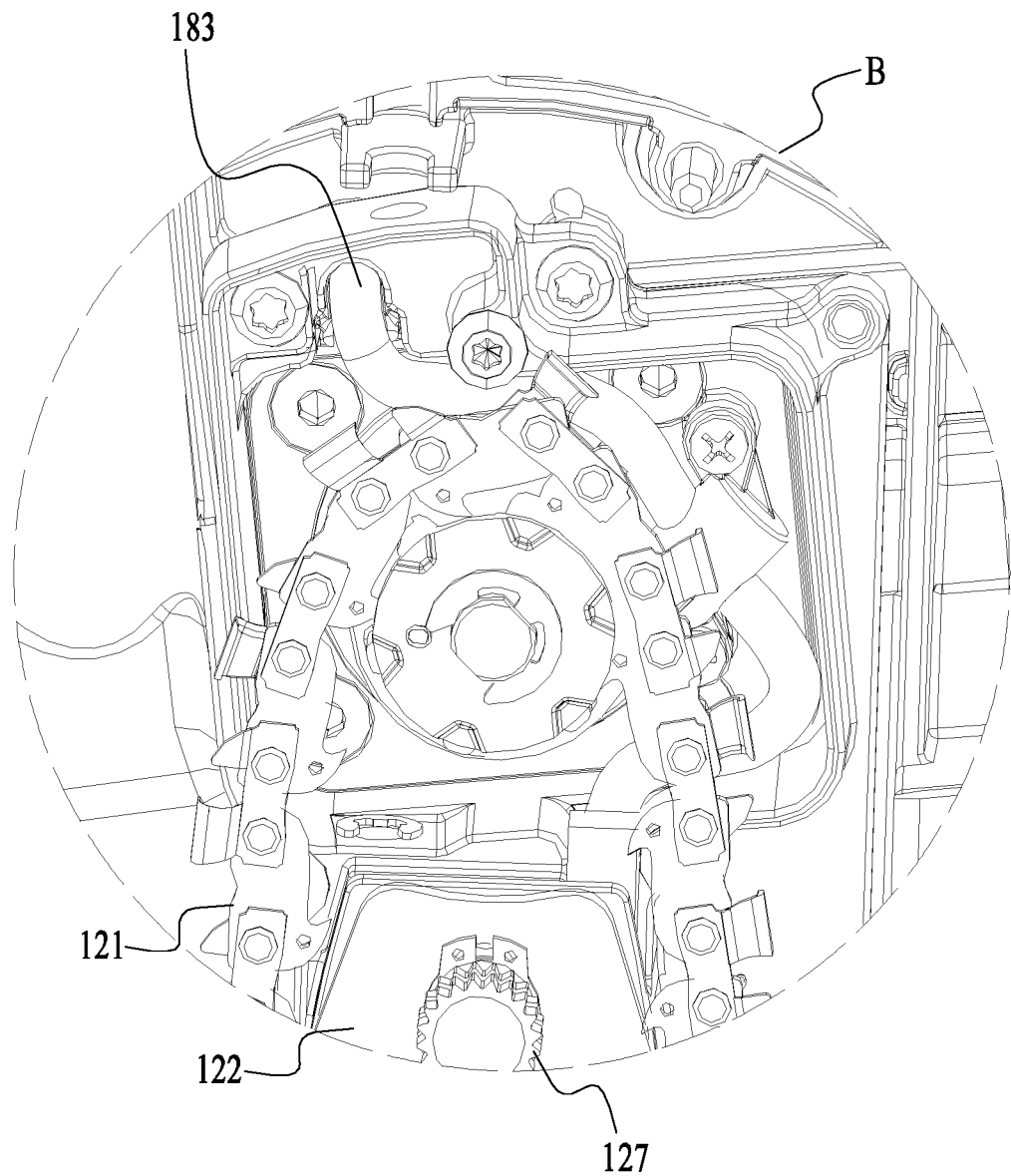
FIG. 19 is a partial enlargement view of the cutting device of FIG. 17 at area B.
Figure 20:
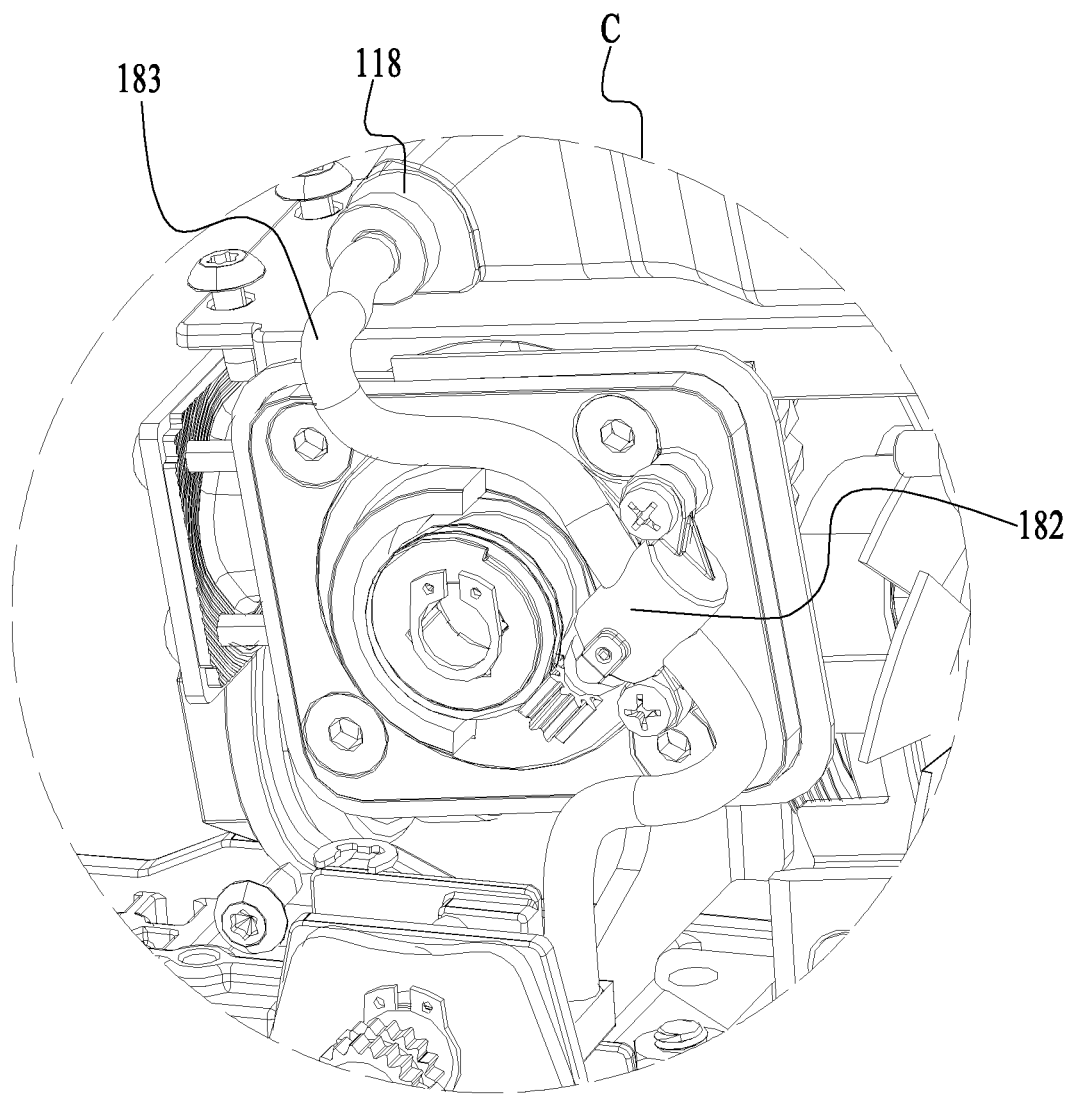
FIG. 20 is a partial enlargement view of the cutting device of FIG. 18 at area C.

As shown in FIG. 17, a cover body 19 is further provided at a junction between the chain 121 and the driving portion 115a, and the cover body 19 is used for at least partially closing the driving portion 115a and at least partially communicates with the housing 11. As shown in FIG. 14, a part of the housing 11 corresponding to the oil outlet of the oil pot 181 is formed with or connected with a connection port 118. One end of the connection port 118 is connected to the oil outlet and the other end of the connection port 118 is connected to the oil delivery pipe 183. Specifically, as shown in FIGS. 17 to 20, the connection port 118 penetrates the body wall of the housing 11, and the oil delivery pipe 183 extends from the connection port 118 to be connected to the oil pump 182 and continues to extend from the oil pump 182 to the guide plate 122, thereby directly supplying oil to the chain 121 mounted on the guide plate 122. In fact, the inside of the guide plate 122 is hollow and communicates with the junction of the chain 121, so the oil delivery pipe 183 can also directly supply oil to the inside of the guide plate 122, and thus can also play a role in lubricating the chain 121. It can be understood that the pipe 181a and the oil delivery pipe 183 can be used as a single pipe body, one end of the pipe 181a extends into the oil pot 181, and the other end of the pipe 181a passes through the connection port 118, connects the oil pump 182 and extends to the guide plate 122. The oil pot 181 is disposed on the housing 11, and then the structure at the driving portion 115a is simplified, and the structure is more compact as a whole, which further reduces the size of the entire cutting device 100.

Figure 21:
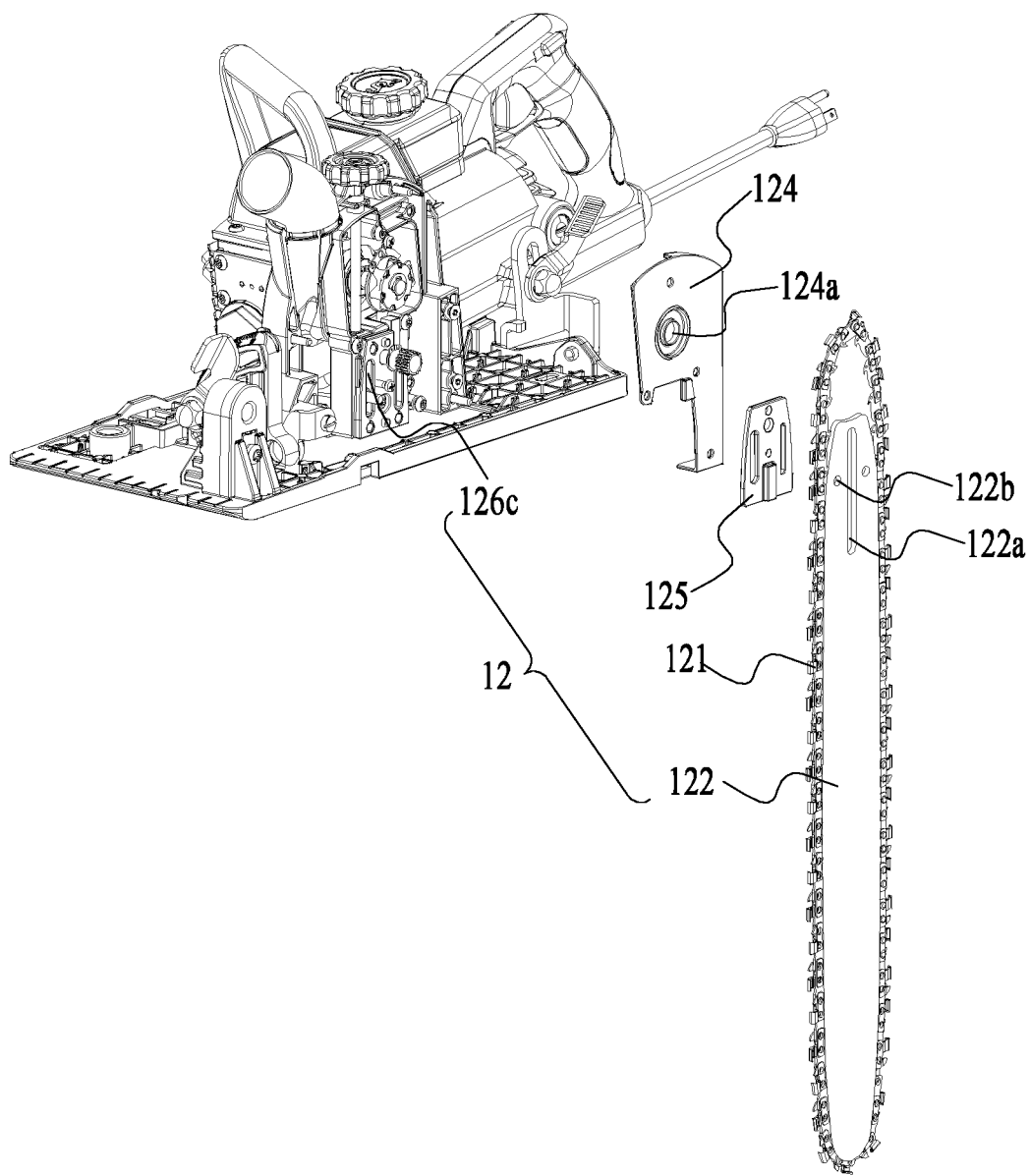
FIG. 21 is a perspective view of a tensioning device of the cutting device of FIG. 1.
Figure 22:
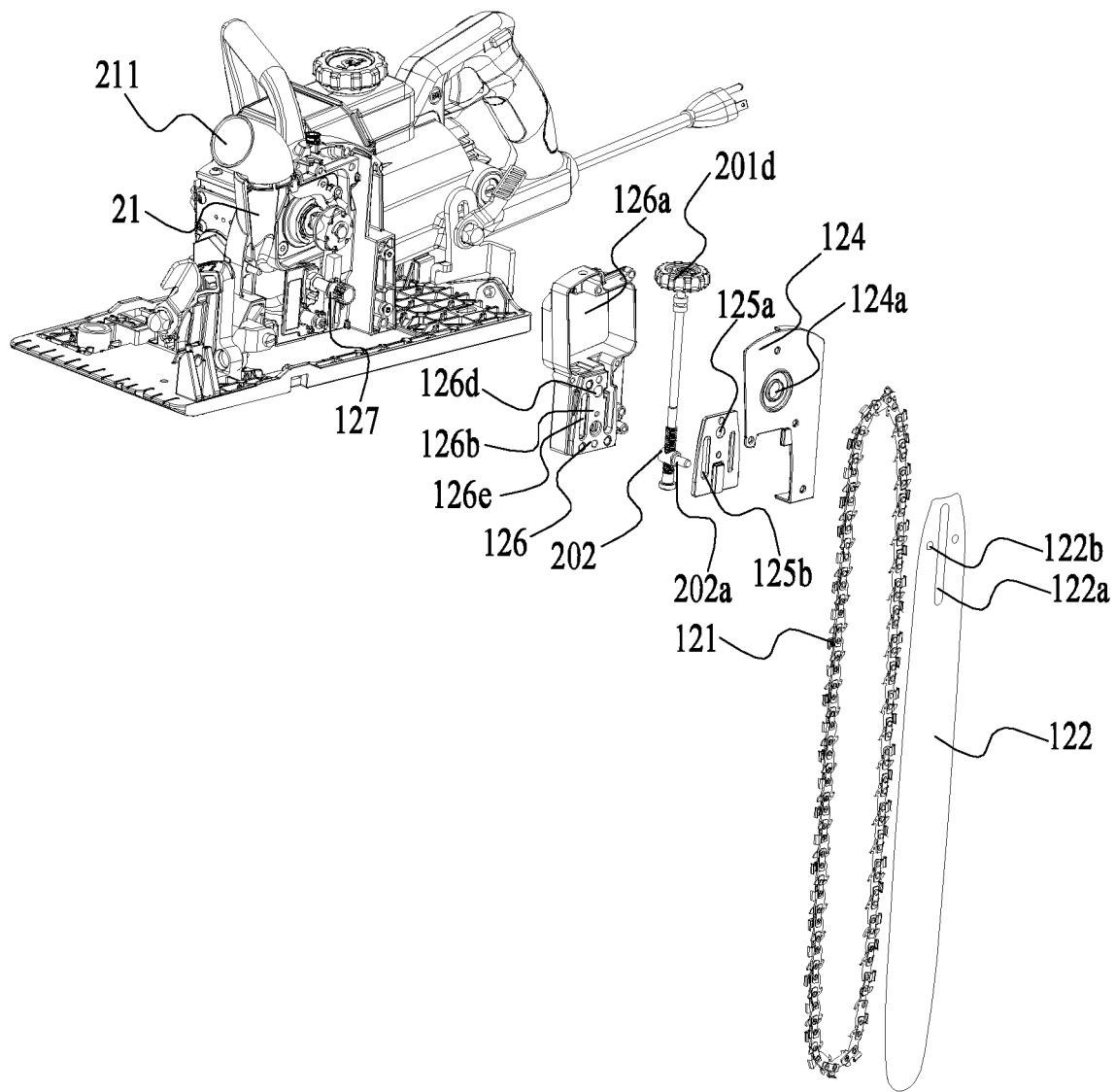
FIG. 22 is a perspective view of the tensioning device of the cutting device of FIG. 21 from another view.

As shown in FIGS. 21 to 22, the cutting portion 12 includes the guide plate 122, the chain 121, a cover plate 124, and the supporting plate 125. The cutting device 100 further includes an encapsulation member 126 for encapsulating the cutting portion 12, and the encapsulation member 126 is used for encapsulating or fixing various parts in a region where the cutting portion 12 is located. The encapsulation member 126 includes two parts, i.e., a penetration portion 126a and an encapsulation portion 126b. In fact, the driving shaft 115 passes through the encapsulation member 126, and the driving portion 115a is at least partially surrounded by the encapsulation member 126. A part of the encapsulation member 126 penetrated by the driving shaft 115 penetrates in the direction of the driving shaft 115 and is formed with the penetration portion 126a. The sealed region on a side of the encapsulation member 126 facing away from the housing 11 is formed with the encapsulation portion 126b, and the encapsulation portion 126b is formed with a second receiving cavity 126c. The cover plate 124 is formed with a first through hole 124a through which the driving shaft 115 can pass, and is used for closing a side of the penetration portion 126a facing away from the housing 11.

The supporting plate 125 is mounted to the encapsulation portion 126b and used for supporting the guide plate 122. The guide plate 122 is formed with a clamping slot 122a, the cutting portion 12 further includes a fastener 127, the supporting plate 125 further includes a second through hole 125a through which the fastener 127 can pass, and the encapsulation portion 126b is also formed with a third through hole 126d that fits the second through hole 125a, that is, when the supporting plate 125 is connected to the encapsulation portion 126b, the second through hole 125a and the third through hole 126d can penetrate in the same linear direction. The fastener 127 fixes the guide plate 122 on the cutting device 100 by passing through the clamping slot 122a of the guide plate 122, the second through hole 125a of the supporting plate 125, and the third through hole 126d of the encapsulation portion 126b. Specifically, the guide plate 122 is fixed to the housing 11 by the fastener 127. As shown in FIG. 2, the fastener 127 can be externally connected with a knob 128, and the user can operate the knob 128 to screw the guide plate 122 to the cutting device 100.

Figure 23:
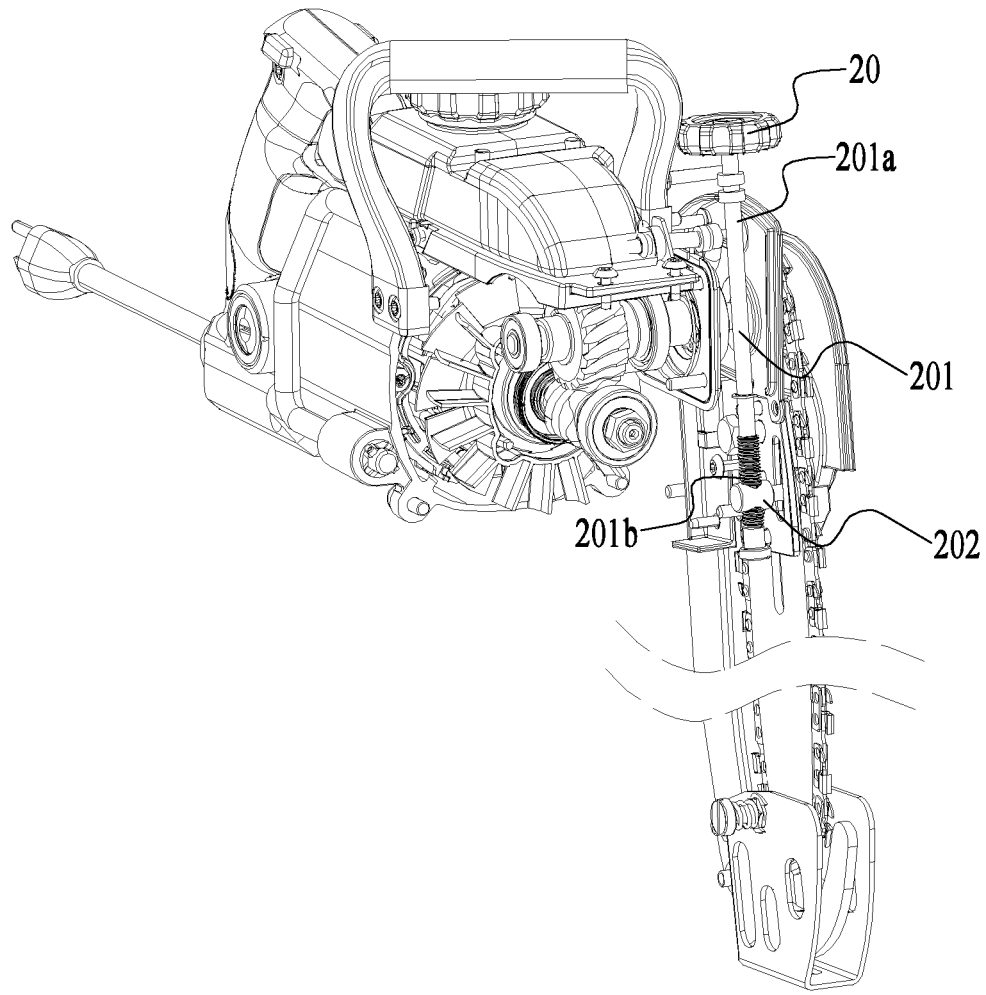
FIG. 23 is an exploded view of a cutting portion of the cutting device of FIG. 1.
Figure 24:
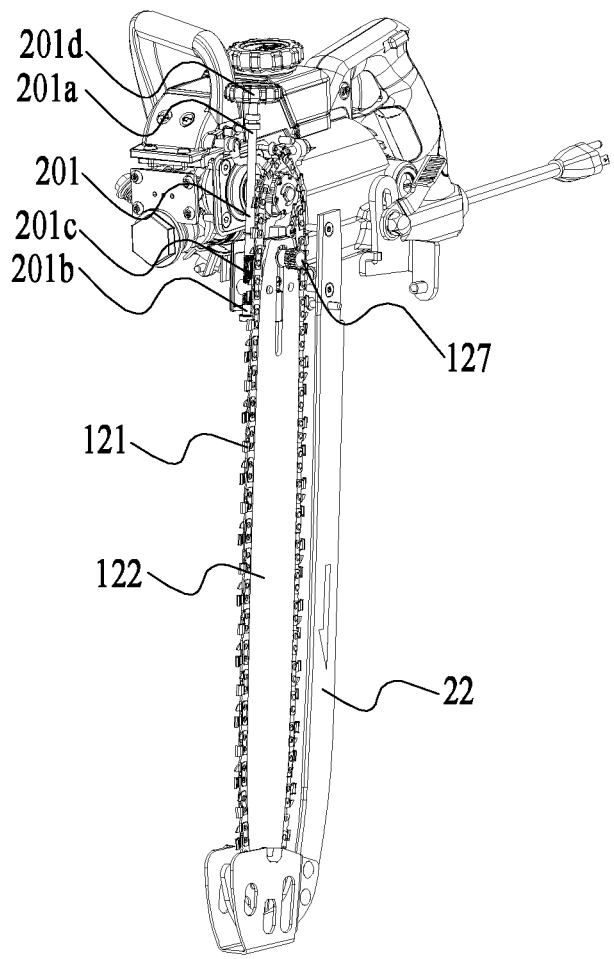
FIG. 24 is a further exploded view of the cutting portion of the cutting device of FIG. 23.

As shown in FIGS. 23 to 24, in order to adjust the guide plate 122 to tension the chain 121, in the example, a tensioning device 20 is further included. The tensioning device 20 includes an adjusting rod 201 extending substantially in the up and down direction, and the adjusting rod 201 includes a first end 201a and a second end 201b. The first end 201a protrudes to the outside of the cover body 19, and the second end 201b is located inside the cover body 19.

When the guide plate 122 is fixed to the cutting device 100 by the fastener 127, the upper and lower positions of the guide plate 122 are adjusted by the tensioning device 20, thereby tensioning or releasing the chain 121. The adjusting rod 201 passes through the encapsulation member 126 in the up and down direction and fixes the adjusting rod 201 itself through a through hole provided in the encapsulation member 126. The part of the adjusting rod 201 close to the second end 201b is formed with a threaded section 201c, the threaded section 201c is connected with a lock pin 202, and the lock pin 202 is formed with or connected with an extension section 202a extending to the guide plate 122. The extension section 202a is perpendicular to or intersects the adjusting rod 201 and can extend into a fourth through hole 122b formed by the guide plate 122. When the user rotates the adjusting rod 201, the locking pin 202 located in the spiral section 201c is caused to move upward or downward, so that the extension section 202a in the fourth through hole 122b of the guide plate 122 drives the guide plate 122 to move upward or downward, thereby tensioning or releasing the chain 121. Here, the threaded section 201c of the adjusting rod 201 and the lock pin 202 together constitute a screw rod structure. In order to achieve the up and down movement of the guide plate 122, the tensioning device 20 may also be implemented in other forms, which will not be repeated here. The supporting plate 125 is formed with a first sliding groove 125b through which the extension section 202a can pass in the left and right direction.

During the process of the up and down movement of the extension section 202a of the lock pin 202 driven by the rotation of the adjusting rod 201, the first sliding groove 125b constitutes a running trajectory of the extension section 202a. In fact, the supporting plate 125 is fixedly connected to the encapsulation member 126, and the position of the encapsulation portion 126b of the encapsulation member 126 corresponding to the first sliding groove 125b is also formed with a section of second sliding groove 126e for the extension section 202a of the lock pin 202 to pass through and move in the sliding groove 125b.

The first sliding groove 125b formed on the supporting plate 125 and the second sliding groove 126e formed on the encapsulation portion 126b have a unique corresponding relationship. The length of the second sliding groove 126e is greater than or equal to the length of the first sliding groove 125b, so as not to affect the movement of the lock pin 202. In this example, the first end 201a of the adjusting rod 201 is further connected with or formed with an operating member 201d, and the user controls the rotation of the adjusting rod 201 by rotating the operating member 201d to adjust the tension of the chain 121. Here, it is defined that the adjusting rod 201 is rotated in a first rotation direction to tension the chain 121, and the adjusting rod 201 is rotated in a second rotation direction to release the chain 121. In fact, the adjusting rod 201 may also be rotated in the first rotation direction to release the chain 121, and the adjusting rod 201 may be rotated in the second rotation direction to tension the chain 121. The first rotation direction may be a clockwise direction, and the second rotation direction may be a counterclockwise direction. Of course, the first rotation direction may be the counterclockwise direction, and the second rotation direction may be the clockwise direction.

Figure 25:
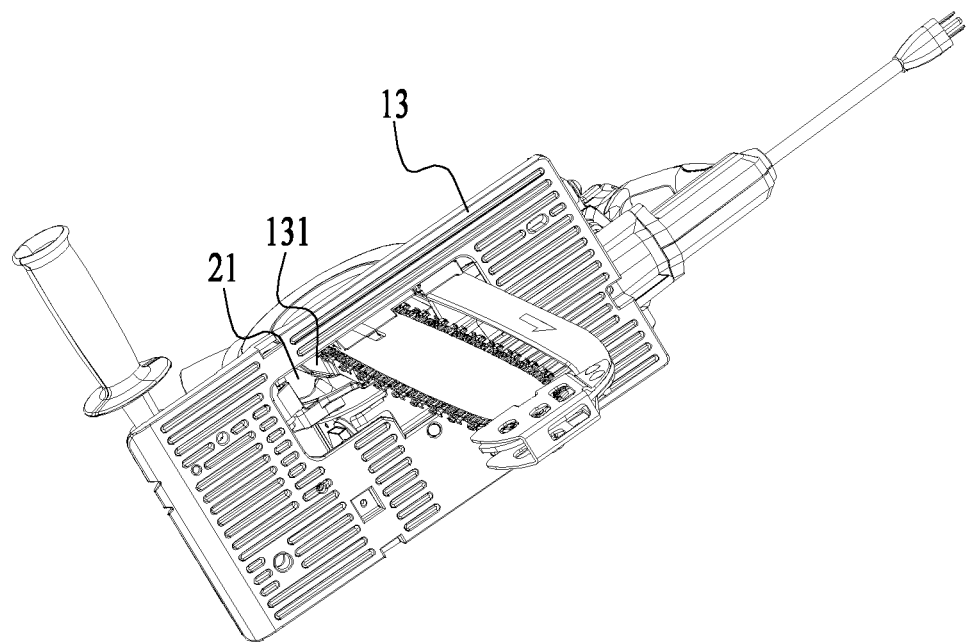
FIG. 25 is a bottom view of the cutting device of FIG. 1.

As shown in FIGS. 22 and 25, in this example, the cutting device 100 is further formed with a chip removal channel 21 for chip removal. Specifically, the chip removal channel 21 extends from the inside of the housing 11, and communicates with a chip outlet 211 through a communication portion between the housing 11 and the cover body 19. More specifically, the chip removal channel 21 extends to the fan 112a of the motor 112, and when the cutting device 100 performs a cutting operation, chips enter the chip removal channel 21 from the cutting portion 12 through a first opening 131 of the bottom plate 13, and are blown out by the blow of the fan 112a. In fact, chips can merely enter the chip removal channel 21 from the front end of the first opening 131 of the bottom plate 13. After the chips enter the chip removal channel 21, due to the chip removal channel 21 extends to the fan 112a, the fan 112a rotates at a high speed under the driving of the motor 112 to form a heat dissipation air. On the one hand, the heat dissipation air can cool the motor 112; on the other hand, the heat dissipation air can also be blown out of the chip removal channel 21 to form a negative pressure in the chip removal channel 21, thereby bringing out chips. It can be understood that the chip outlet 211 may also be externally connected with a dust suction device, and can also achieve dust suction.

Figure 26:
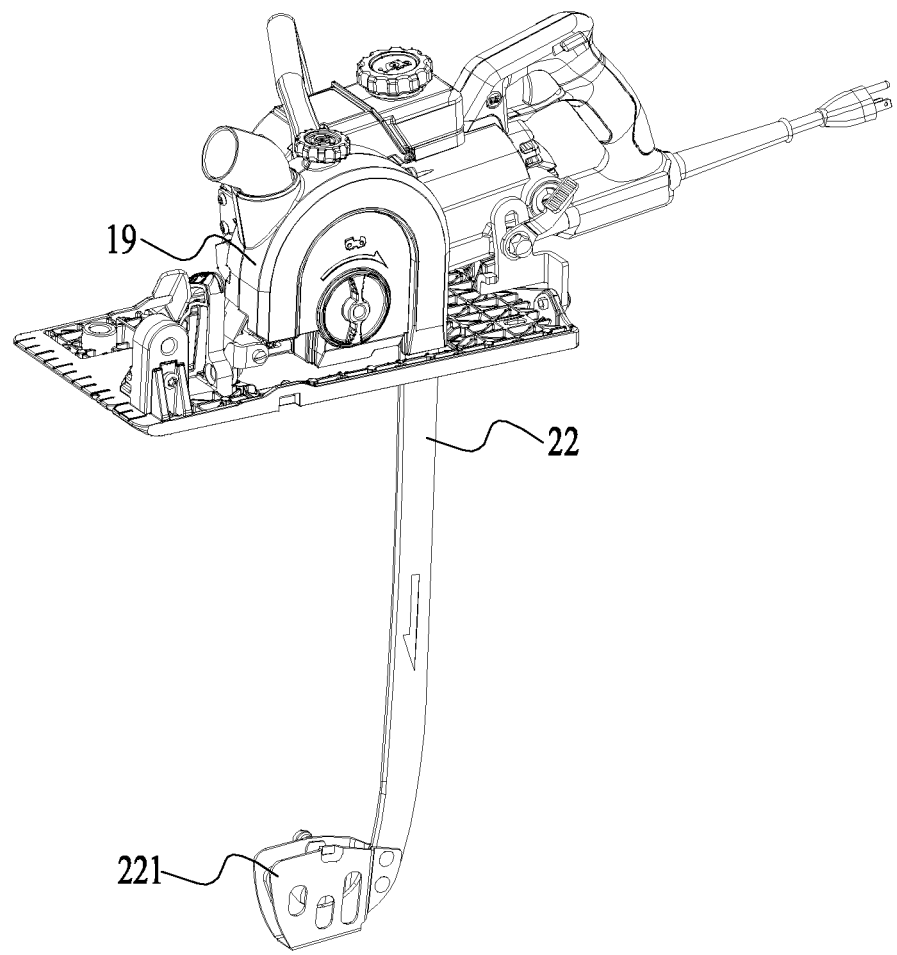
FIG. 26 is a perspective view of the cutting device of FIG. 1 with a cutting portion removed.
Figure 27:
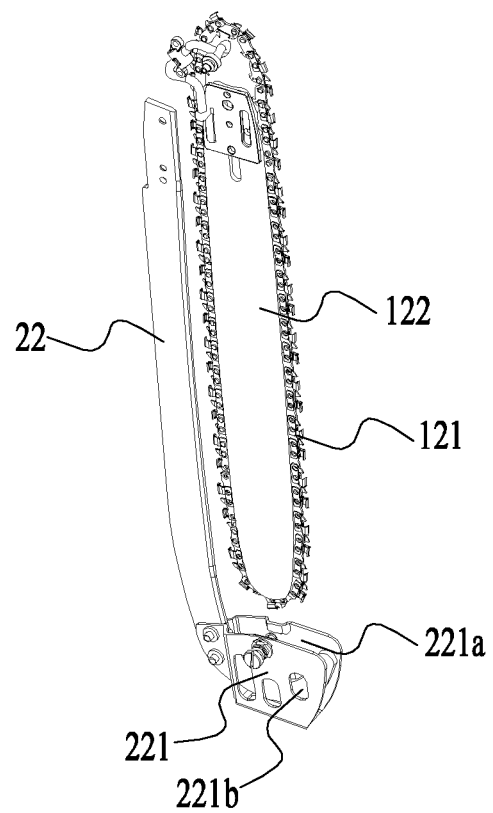
FIG. 27 is an exploded view of a knife following plate and a cutting portion of the cutting device of FIG. 1.
Figure 28:
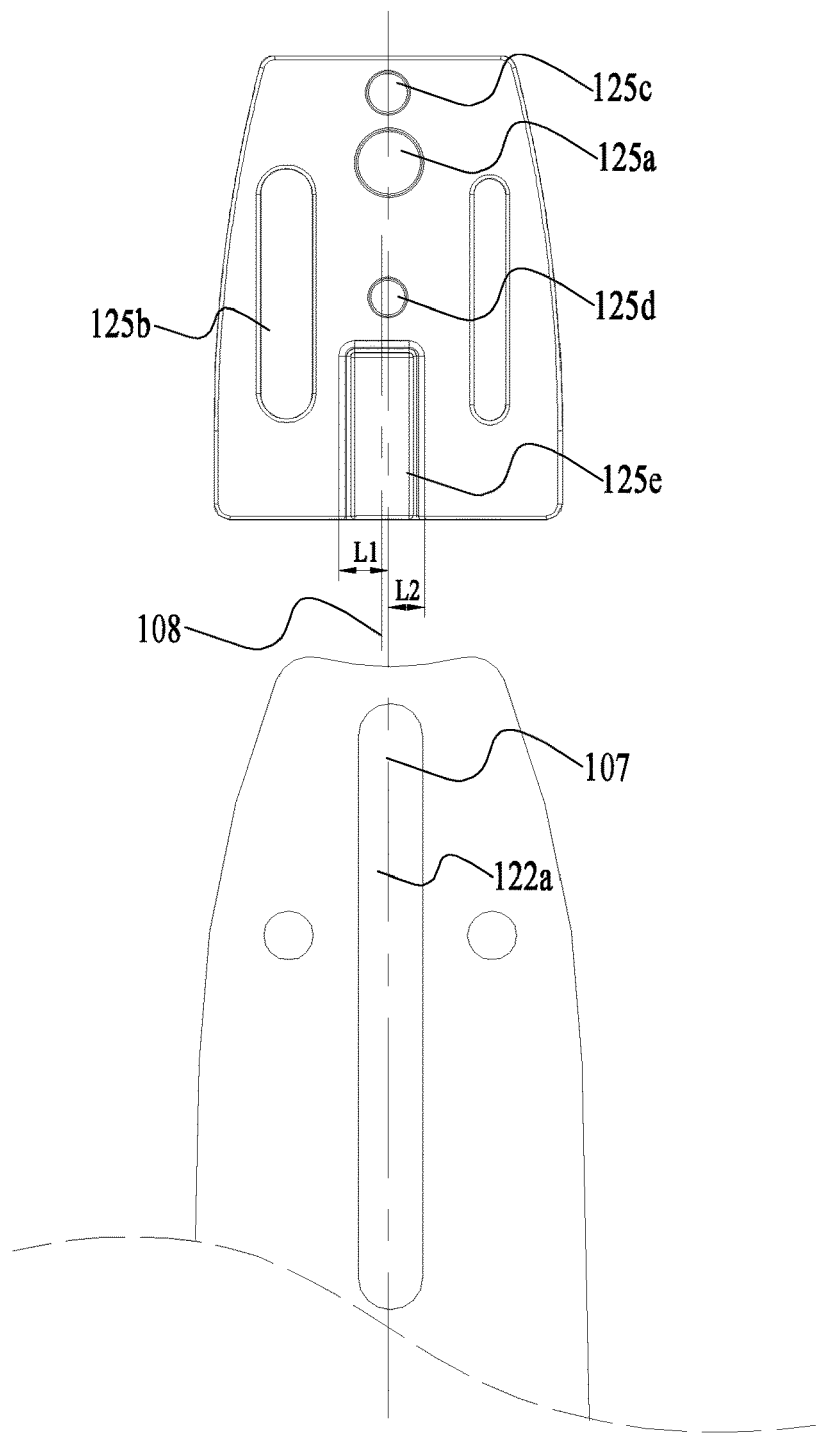
FIG. 28 is a plan view of a supporting plate and a guide plate of the cutting device of FIG. 24.
Figure 29:
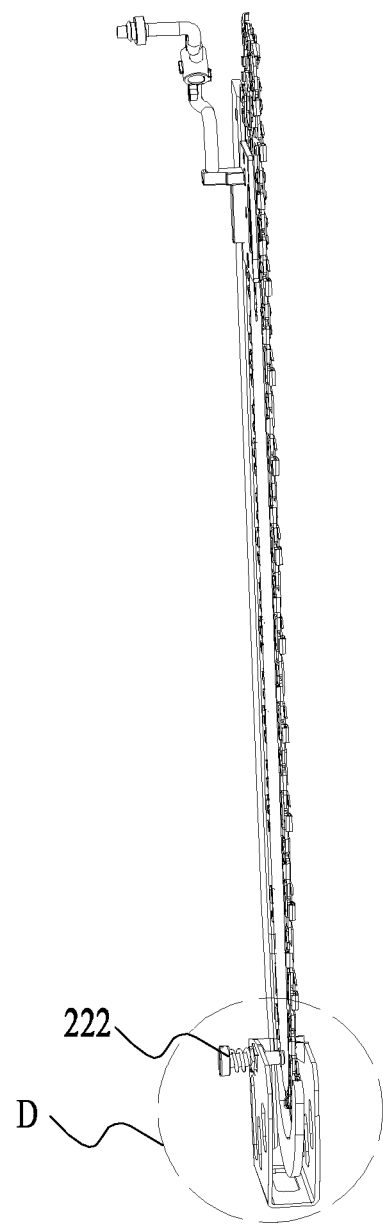
FIG. 29 is a perspective view of a knife following plate of the cutting device of FIG. 1 and an adjusting member of a cutting portion in a first position.
Figure 30:
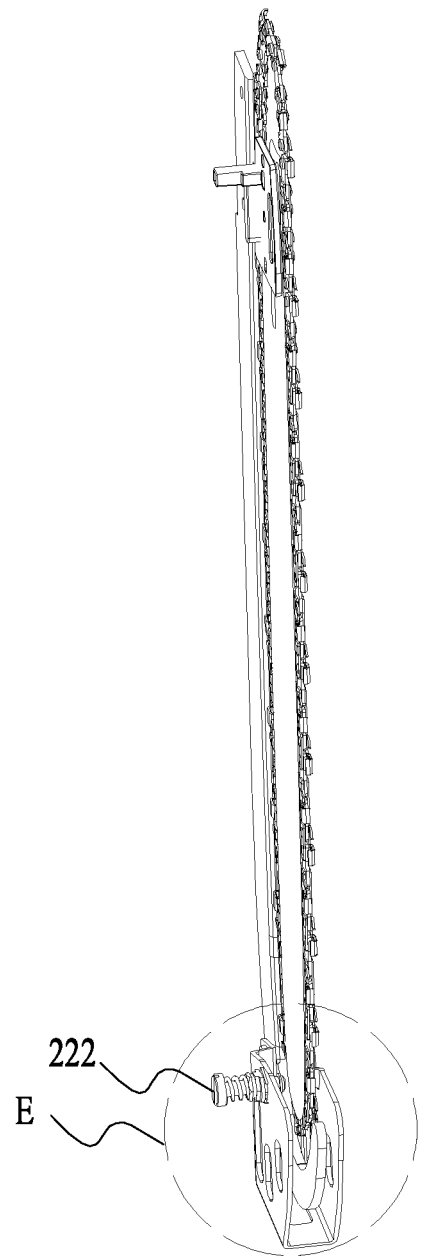
FIG. 30 is a perspective view of a knife following plate of the cutting device of FIG. 1 and the adjusting member of the cutting portion in a second position.
Figure 31:
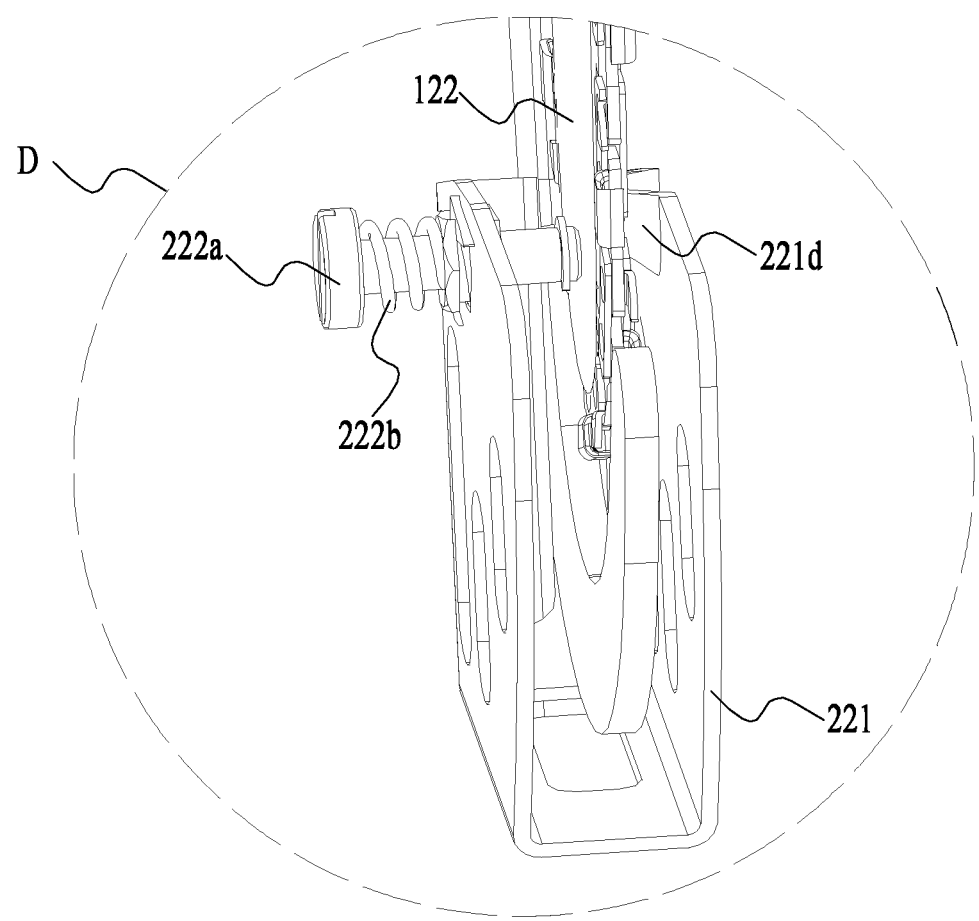
FIG. 31 is a partial enlargement view of the cutting device of FIG. 29 at area D.
Figure 32:
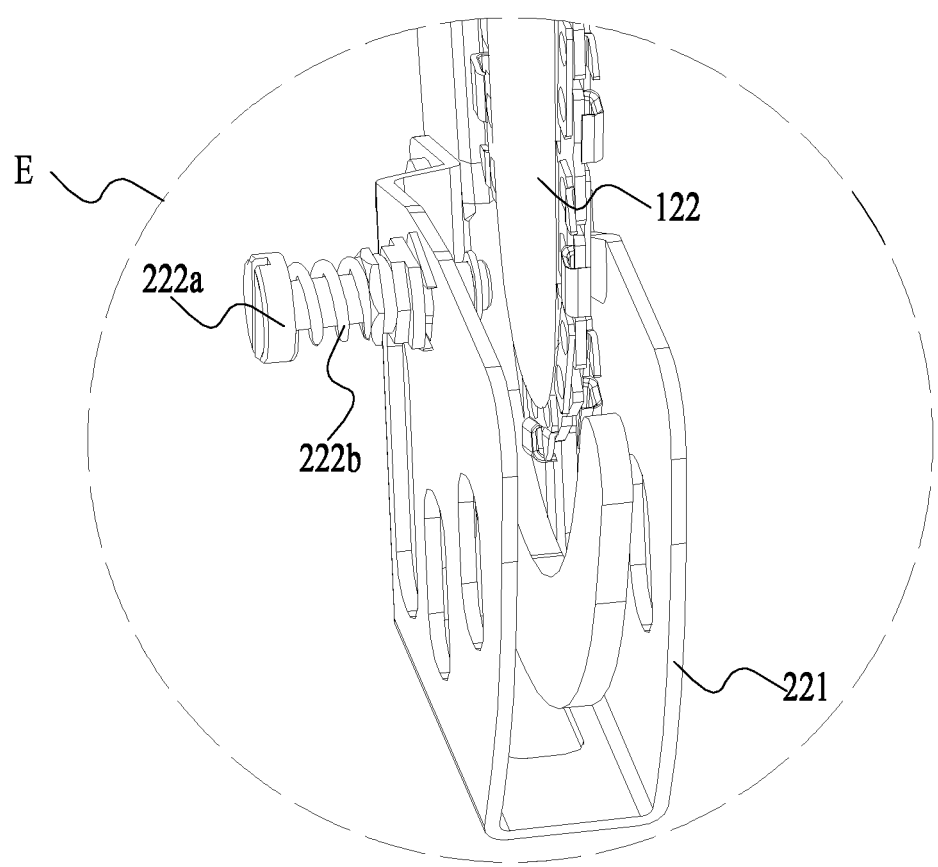
FIG. 32 is a partial enlargement view of the cutting device of FIG. 30 at area E.

As shown in FIGS. 26 to 27, the cutting device 100 in this example further includes a knife following plate 22. The knife following plate 22 is fixedly connected to the housing 11. The knife following plate 22 extends along the extending direction of the guide plate 122, and a protective cover 221 at least partially covering the guide plate 122 is formed at the end. The knife following plate 22 is located on the rear side of the guide plate 122. It can be understood that, in the working state of the chain 121, the front end is directly in contact with the workpiece, and due to the reaction force of the workpiece and the vibration of the chain 121 itself, the chain 121 has a tendency of moving toward the knife following plate 22. In order to effectively protect the knife following plate 22 from being cut and damaged by the chain 121, a safe distance needs to be maintained between the chain 121 and the knife following plate 22. In addition, during the production and mounting of the knife following plate 22 and the guide plate 122, unnecessary errors may exist, which may cause the distance between the knife following plate 22 and the guide plate 122 to be too small. Therefore, during the mounting of the knife following plate 22, the knife following plate 22 has a preset angle at which the knife following plate 22 deviates from the guide plate 122. In this example, the guide plate 122 also has a preset angle at which the knife following plate 22 actively deviates from the knife following plate 22.

As shown in FIGS. 21 to 22 and FIGS. 26 to 28, the guide plate 122 is positioned on the cutting device 100 through the supporting plate 125. The supporting plate 125 is substantially symmetrical about a symmetrical straight line 107. The upper and lower sides of the second through hole 125a of the supporting plate 125 are respectively provided with a first positioning hole 125c and a second positioning hole 125d. The first positioning hole 125c and the second positioning hole 125d are used for positioning the supporting plate 125 on the encapsulation member 126 to avoid shaking of the supporting plate 125 during work. Preferably, the first positioning hole 125c, the second positioning hole 125d, and the second through hole 125a are all circular holes, and the circle centers of the first positioning hole 125c and the second positioning hole 125d are located on the symmetrical straight line 107.

In the extending direction of the symmetrical straight line 107, the first positioning hole 125a is facing away from the second positioning hole 125d. The circle center of the second through hole 125a is located to the right of the symmetrical straight line 107. The lower end of the second positioning hole 125d is connected with or formed with a positioning portion 125e for positioning the guide plate 122, and the positioning portion 125e is a protrusion protruding from the plane where the supporting plate 125 is located.

In order to adapt to the shape of the clamping slot 122a of the guide plate 122, the positioning portion 125e is preferably provided as a cuboid, and is symmetrical about a central axis 108 passing through the positioning portion 125e itself. In this example, the central axis 108 of the positioning portion 125e is parallel to and does not coincide with the symmetrical straight line 107. The distance between the central axis 108 and the symmetrical straight line 107 is greater than or equal to 0.1 mm in a linear direction that is perpendicular to both the central axis 108 and the symmetrical straight line 107. More specifically, the central axis 108 is located on the front side of the symmetrical straight line 107, that is, the central axis 108 is located on the side of the symmetrical straight line 107 close to the sliding groove 125b. It can be understood that the positioning portion 125e is asymmetrical about the symmetrical straight line 107. The distance between the part of the positioning portion 125e facing toward the cutting direction and the symmetrical straight line 107 is L1, and the distance between the part of the positioning portion 125e facing away from the cutting direction and the symmetrical straight line 107 is L2, where L1 is greater than L2. Therefore, when the guide plate 122 is mounted, the guide plate 122 is fixed by the supporting plate 125, the supporting plate 125 can effectively fix the guide plate 122, and the guide plate 122 can also be away from the knife following plate 22 to a preset distance when the positioning portion 125e itself deviates from the symmetrical straight line 107, so that the minimum distance between the tooth tip of the chain 121 mounted on the guide plate 122 and the knife following plate 22 is greater than or equal to 6 mm and less than or equal to 18 mm.

As shown in FIG. 27, the protective cover 221 formed at or connected to the end of the knife following plate 22 at least partially surrounds the guide plate 122 and a chain 121 mounted on the guide plate 122. The protective cover 221 is formed with a third receiving cavity 221a for at least partially receiving the guide plate 122 and the chain 121. The third receiving cavity 221a is in communication with the outside, and is formed with a plurality of second openings 221b communicating with the outside. The second opening 221b is used for discharging chips and dust brought into the third receiving cavity 221a during the cutting process of the chain 121.

As shown in FIGS. 29 to 32, the protective cover 221 is further provided with an adjusting member 222 for adjusting a connection relationship between the knife following plate 22 and the guide plate 122. The adjusting member 222 has two adjusting positions, that is, a first position and a second position. When the adjusting member 222 is located at the first position, the protective cover 221 and the guide plate 122 are fixed into a whole by the adjusting member 222, thereby increasing the stiffness between the the protective cover 221 and the guide plate 122 and avoiding damage to the guide plate 122 or the knife following plate 22 due to the stiffness problem under the premise of a weak structure. In fact, a position of the protective cover 221 corresponding to the adjusting member 222 is also formed with or connected with a boss 221d. When the adjusting member 222 is at the first position, the boss 221d is at least partially overlapped with the adjusting member 222 along the extending direction of the adjusting member 222, so as to be able to cooperate with the adjusting member 222 to clamp the guide plate 122. When the adjusting member 222 is at the second position, the protective cover 221 is detached from the guide plate 122, which facilitates the detachment and maintenance of the guide plate 122, and also facilitates the detachment and maintenance of the chain 121. Specifically, the adjusting member 222 includes an adjusting shaft 222a, an elastic member 222b, and a reinforcing ring 222c. The cover wall of the protective cover 221 is formed with a first mounting hole 221c through which the adjusting member 222 can pass, and the first mounting hole 221c penetrates the cover wall of the protective cover 221. In this example, since the protective cover 221 is made of a thin material, the strength of the protective cover 221 is insufficient, so a reinforcing ring 222c is provided for strengthening the strength of the region where the first mounting hole 221c is located. The reinforcing ring 222c passes through the first mounting hole 221c and is latched on the hole wall of the first mounting hole 221c. More specifically, one end of the reinforcing ring 222c is formed with a protruding portion, and the protruding portion makes the reinforcing ring 222c have an end face with a larger size than the first mounting hole 221c, so that the reinforcing ring 222c can merely penetrate into the first mounting hole 221c from one end. The adjusting member 222 further includes a first buckle 222e for fixing the reinforcing ring 222c. The reinforcing ring 222c has a first limiting groove 222d that cooperates with the first buckle 222e. When the reinforcing ring 222c penetrates through the first mounting hole 221c, the first buckle 222e is fitted into the first limiting groove 222d, and at this time, the reinforcing ring 222c is limited in the first mounting hole 221c.

It can be understood that the reinforcing ring 222c further includes a through hole through which an adjusting shaft 222a can pass. In this example, the adjusting shaft 222a is formed with an external thread structure, and the through hole of the reinforcing ring 222c is formed with an internal thread structure. The position of the adjusting shaft 222a can be adjusted through the cooperation of the external thread structure and the internal thread structure. Before the adjusting shaft 222a passes through the through hole, the elastic member 222b is also mounted. A pre-tensioning force exists between the adjusting shaft 222a and the reinforcing ring 222c through the elastic member 222b to prevent the adjusting shaft 222a from being detached from the reinforcing ring 222c. In fact, the adjusting member 222 further includes a second buckle 222f, and the adjusting shaft 222a further includes a second limiting groove 222g that cooperates with the second buckle 222f. After the adjusting shaft 222a passes through the through hole of the reinforcing ring 222c, the second buckle 222f may also be snapped into the second limiting groove 222g in the third receiving cavity 221a, thereby further preventing the adjusting shaft 222a from loosening during use.

Figure 33:
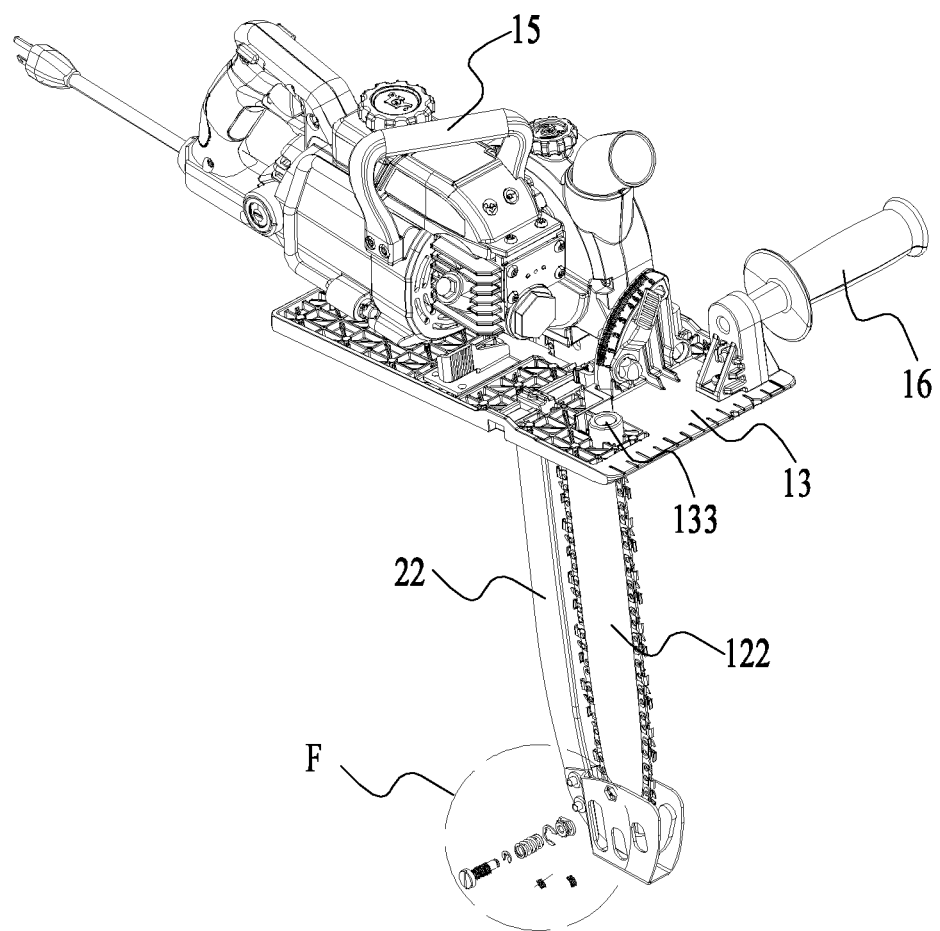
FIG. 33 is an exploded view of an adjusting member of the cutting device of FIG. 1.
Figure 34:
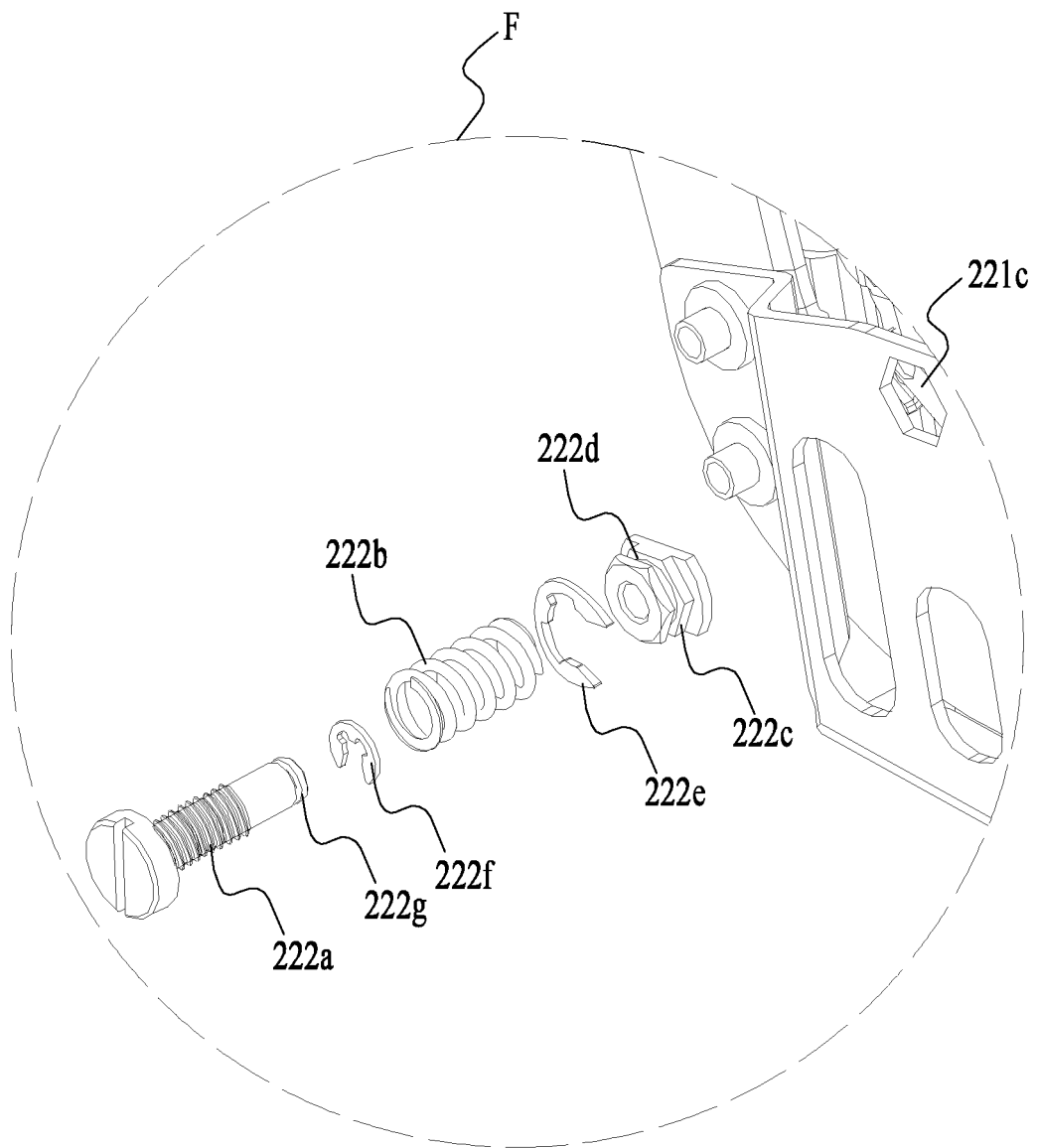
FIG. 34 is a partial enlargement view of the cutting device of FIG. 33 at area F.

As shown in FIG. 33, the second auxiliary handle 16 of the cutting device 100 is formed at or connected to the front end of the bottom plate 13, and can be held by the user to operate the cutting device 100. It can be understood that the first auxiliary handle 15 may be used by the user to lift the cutting device 100, and the second auxiliary handle 16 may be directly held by the user to operate the cutting device 100. Different operation manners may be suitable for the user to cope with different working conditions.

Figure 35:
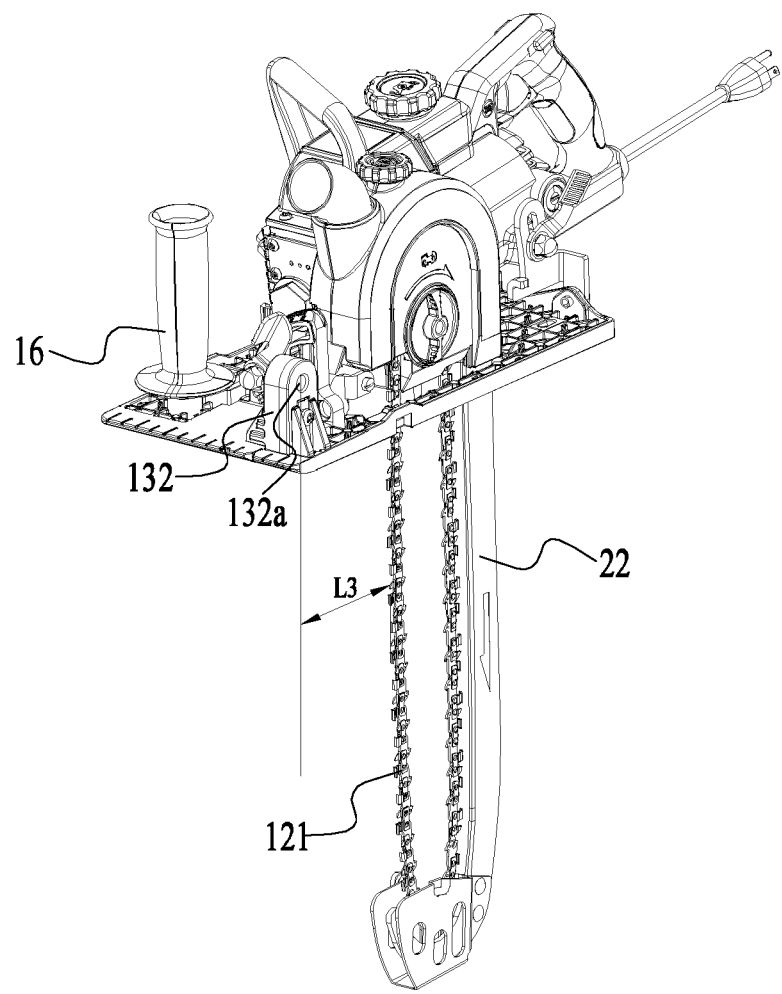
FIG. 35 is a perspective view of a second auxiliary handle of the cutting device of FIG. 1 mounted to a storage position.

As shown in FIG. 35, a second mounting portion 132 is disposed on the left side of the front end of the bottom plate 13, the second mounting portion 132 is formed with a second mounting hole 132a, and the second auxiliary handle 16 is mounted into the second mounting hole 132a. In this example, the second mounting hole 132a is provided with an internal thread structure, the part of the second auxiliary handle 16 mounted to the second mounting hole 132a is provided with an external thread structure, and the cooperation of the internal thread structure and the external thread structure makes the second auxiliary handle 16 mounted on the second mounting portion 132. In fact, the mounting manner of the second mounting portion 132 and the second auxiliary handle 16 is not limited to the above-mentioned manner, as long as the second auxiliary handle 16 can be fixed to the second mounting portion 132, which will not be repeated here. The second mounting portion 132 provided is actually protruding from the plane where the bottom plate 13 is located, and the second mounting portion 132 may be integrally formed with or may form a detachable connection with the bottom plate 13. In some preferred examples, the second mounting portion 132 is detachably connected to the bottom plate 13, so on the one hand, the manufacturing process of the bottom plate 13 is reduced and the manufacturing cost is reduced; on the other hand, if the user operates the cutting device 100 by holding the second auxiliary handle 16, the position of the second auxiliary handle 16 actually constitutes a fulcrum position, and when the cutting device 100 accidentally falls from a high place, the second auxiliary handle 16 can play a supporting role, thereby counteracting most of the impulse of the cutting device 100 and preventing the cutting device from being damaged due to drops and other reasons. In fact, when the second auxiliary handle 16 is mounted on the second mounting portion 132, the second auxiliary handle 16 cooperates with the bottom plate 13 to form an anti-fall surface perpendicular to the cutting direction.

It can be understood that since the second auxiliary handle 16 is disposed at the front end of the bottom plate 13 and is also located at the front end of the chain 121, a sufficient safety distance needs to be set between the second auxiliary handle 16 and the chain 121 to prevent the user from being cut by the chain 121. The minimum linear distance from the circle center of the second mounting hole 132a of the second mounting portion 132 to the tooth tip of the chain 121 is L3. In this example, the size of L3 is greater than or equal to 120 mm. With this distance, it can be basically guaranteed that the user will not be cut by the chain 121 when holding the second auxiliary handle 16 to operate the cutting device 100.

In addition, when the user does not need to use the second auxiliary handle 16 or needs to accommodate the cutting device 100, a storage portion 133 is further provided on the bottom plate 13. Specifically, the storage portion 133 is located on the right side of the front end of the bottom plate 13, and may specifically be an internal thread hole suitable for the second auxiliary handle 16. The user can mount the second auxiliary handle 16 to the internal thread hole of the storage portion 133 to complete accommodation.

Figure 36:
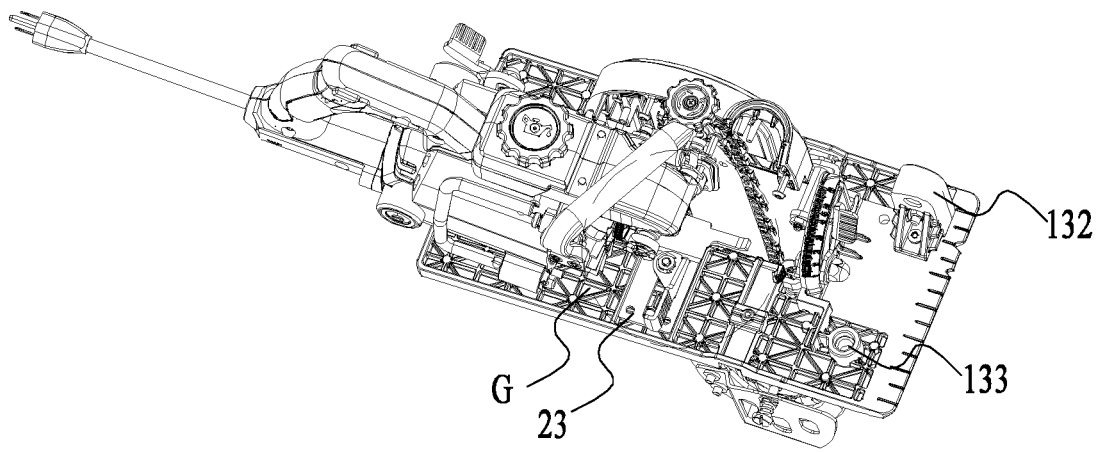
FIG. 36 is a top view of the cutting device of FIG. 1 with a second auxiliary handle removed.

As shown in FIG. 36, the cutting device 100 further includes a pressing plate 23 for improving the cutting quality. The pressing plate 23 as a whole has a rectangular shape with a connection port 231 that can be connected to the bottom plate 13 and a slider 233 extending from the body of the pressing plate 23 and basically parallel to the chain 121.

Figure 37:
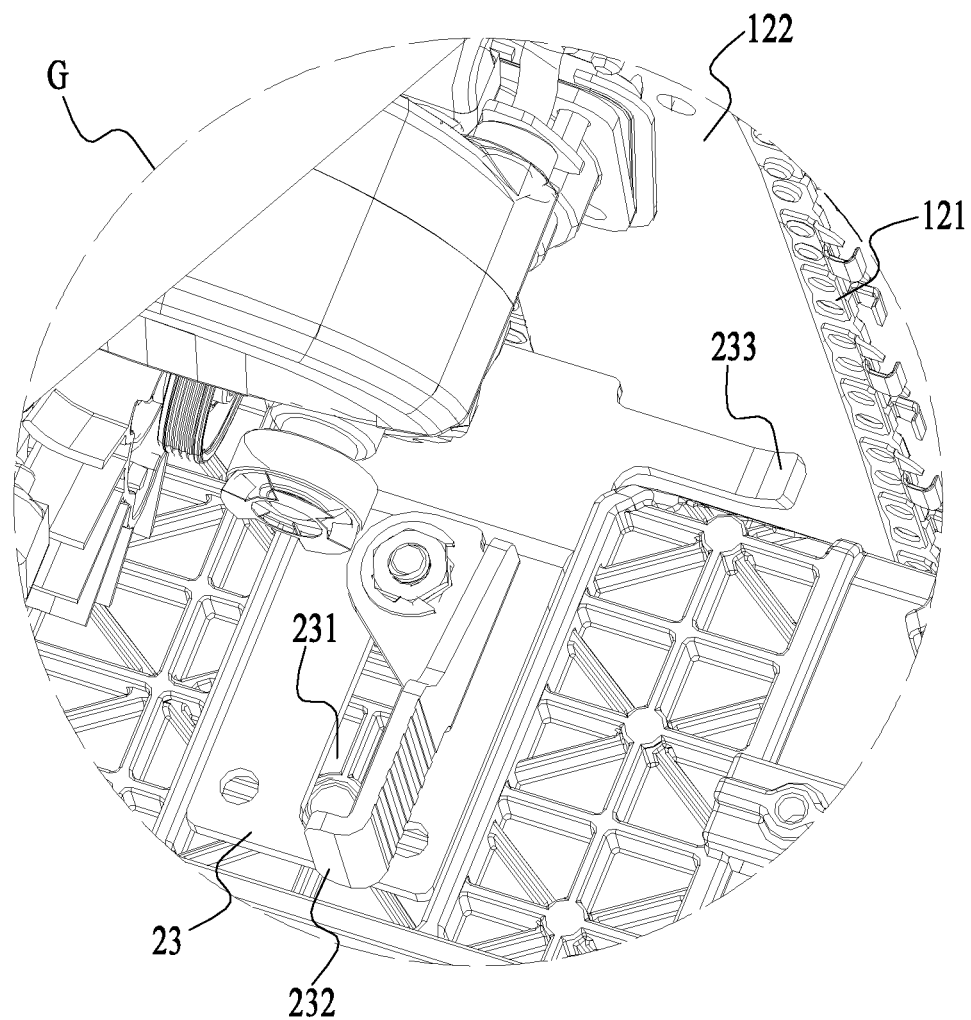
FIG. 37 is a partial enlargement view of the cutting device of FIG. 36 at area G.

Specifically, as shown in FIG. 37, the pressing plate 23 extends in a plane parallel to the plane of the bottom plate. The connection port 231 of the pressing plate 23 extends substantially along the direction of the second straight line 105, is substantially groove-shaped, and is located inside the plane of the pressing plate, that is, the connection port 231 does not communicate with any side of the pressing plate 23. In fact, the connection port 231 may be regarded as a section of guide rail, the pressing plate 23 is fixed to the bottom plate 13 through a fixing member 232, and the relative position of the pressing plate 23 and the chain 121 can be freely adjusted within the range where the guide rail is located. In some preferred examples, the pressing plate 23 is further connected with or formed with a slide rail, and the slide rail can allow the pressing plate 23 to slide freely in the direction of the second straight line 105. The slider 233 is specifically a smooth arc segment protruding from the plane of the pressing plate 23, and has an upward slant angle relative to the plane of the pressing plate 23. One end of the slider 233 close to the chain 121 further has an end surface substantially parallel to the guide plate 122. When the cutting device 100 performs a cutting operation, the slider 233 can press the cut surface of the workpiece while the workpiece is cut by the chain 121 to avoid more burrs on the cut surface and avoid the influence on the quality of the cutting surface. In fact, in this example, the pressing plate 23 has two adjusting positions, that is, a first adjusting position and a second adjusting position. When the pressing plate 23 is in the first adjusting position, the slider 233 is close to the chain 121, and the slider 233 is at least partially parallel to the chain 121 along a linear direction perpendicular to the plane of the guide plate 122, so that the cutting surface can be pressed. When the pressing plate 23 is in the second adjusting position, the slider 233 is away from the chain 121. When the slider 233 is close to the chain 121, it can be ensured that the slider 233 is in close contact with the cutting surface and will not jam the chain 121 or affect the cutting. When the slider 233 is away from the chain 121, the cutting of the chain 121 will not be affected.

The basic principles, main features and advantages of the disclosed examples have been shown and described above. Those skilled in the art should understand that the above examples do not limit the claimed invention in any form, and that any technical solution obtained by means of equivalent substitution or equivalent transformation falls within the protection scope of the claimed invention.

What is claimed is:

1. A cutting device, comprising:
   a housing formed with a handle portion and an accommodation portion;
   a cutting portion connected to the housing and at least partially disposed in the accommodation portion;
   a motor disposed in the accommodation portion and extending in a first linear direction;
   a fan connected to the motor;
   a bottom plate extending in a plane of the bottom plate and formed with an opening through which at least part of the cutting portion passes; and
   a worm gear and worm structure, and the worm gear and worm structure disposed in the accommodation portion;
   wherein the cutting portion comprises a chain and a guide plate configured to support the chain, the motor comprises the output shaft, the cutting portion is connected to a driving shaft, the output shaft transmits power to the driving shaft through a worm gear and a worm, and the driving shaft is capable of driving the chain.

2. The cutting device according to claim 1, wherein the output shaft extends in the first linear direction and the driving shaft extends in a second linear direction which is perpendicular to or intersects the first linear direction.

3. The cutting device according to claim 1, wherein the worm is disposed on the output shaft, the worm gear is disposed on the driving shaft, and the worm gear is kept in mesh with the worm.

4. The cutting device according to claim 3, wherein the fan is connected to the output shaft and a flow guide member is disposed between the fan and the worm.

5. The cutting device according to claim 1, wherein the driving shaft is connected with a driving portion and the chain is connected to the driving portion and is driven by the driving portion to cut a workpiece.

6. The cutting device according to claim 1, wherein the output shaft is supported by a first bearing and the first bearing is disposed in the accommodation portion and is fixed to the housing through a fixed end disposed inside the housing.

7. The cutting device according to claim 6, wherein the fixed end is disposed inside the housing and does not protrude from an outer surface of the housing.

8. The cutting device according to claim 1, wherein, in a linear direction perpendicular to the plane of the bottom plate, the housing has a projection on the plane of the bottom plate, and, in a linear direction parallel to a second straight line, the projection is in a region where the bottom plate is located.

9. The cutting device according to claim 1, wherein, in a linear direction perpendicular to the plane of the bottom plate, a distance between a shaft center of the driving shaft and the plane of the bottom plate is greater than or equal to 90 mm and less than or equal to 100 mm.

10. The cutting device according to claim 1, wherein, in a linear direction perpendicular to the plane of the bottom plate, a length from the driving shaft to the plane of the bottom plate is less than or equal to a length from the motor to the plane of the bottom plate.

11. The cutting device according to claim 1, wherein the cutting device further comprises a lubricating device configured to lubricate the cutting portion and an auxiliary handle connected to the housing, the lubricating device comprises an oil can, and the housing is formed with a first mounting portion configured to mount the oil can and the oil can is disposed between the auxiliary handle and the bottom plate.

12. The cutting device according to claim 11, wherein the first mounting portion extends in a plane parallel to the plane of the bottom plate and the first mounting portion is located between the auxiliary handle and the bottom plate.

13. The cutting device according to claim 1, wherein the cutting portion is further connected with a knife following plate, the knife following plate further comprises a protective cover configured to cover at least part of an end of the guide plate; the protective cover further comprises an adjusting member, the adjusting member has a first position and a second position relative to the guide plate, when the adjusting member is in the first position, the knife following plate is connected to the guide plate as a whole through the adjusting member, and, when the adjusting member is in the second position, the knife following plate is separated from the guide plate.

14. The cutting device according to claim 13, wherein the knife following plate extends along a direction of the guide plate and is fixedly connected to or integrally formed with the protective cover and the adjusting member is detachably connected to the protective cover.

15. The cutting device according to claim 13, wherein, in a linear direction extending along a cutting direction, a minimum distance between the knife following plate and the chain is greater than or equal to 6 mm and less than or equal to 18 mm.

16. The cutting device according to claim 5, wherein when the output shaft drives the fan to rotate, an air flow formed by the fan comprises a first air path and a second air path, the first air path provides a heat dissipation outlet for heat dissipation; and the second air path provides is a chip outlet for chip removal.

17. The cutting device according to claim 16, wherein the cutting device further comprises a cover body configured to at least partially enclose the driving portion and the chain, the cover body at least partially communicates with the housing, and the chip outlet is disposed at a junction between the housing and the cover body.

18. The cutting device according to claim 17, wherein a chip removal channel configured for the chip removal is formed at a communication portion of the cover body and the housing; one end of the chip removal channel extends to the fan, and another end of the chip removal channel extends to the chip outlet.

19. The cutting device according to claim 18, wherein the bottom plate is formed with a first opening configured for the chain to pass through and the first opening communicates with the chip removal channel.

20. The cutting device according to claim 18, wherein the second air path flows through the first opening along the chip removal channel and is discharged from the chip outlet.

* * * * *